(12) United States Patent
Ishii et al.

(10) Patent No.: US 10,264,150 B2
(45) Date of Patent: Apr. 16, 2019

(54) IMAGE READING APPARATUS THAT INHIBITS FLAT CABLE FROM CONTACTING CONTACT GLASS, AND IMAGE FORMING APPARATUS

(71) Applicant: Kyocera Document Solutions Inc., Osaka (JP)

(72) Inventors: Akira Ishii, Osaka (JP); Naozumi Ogawa, Osaka (JP); Masuo Kawamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/856,029

(22) Filed: Dec. 27, 2017

(65) Prior Publication Data

US 2018/0183958 A1    Jun. 28, 2018

(30) Foreign Application Priority Data

Dec. 28, 2016   (JP) .................. 2016-256869

(51) Int. Cl.
*H04N 1/00* (2006.01)

(52) U.S. Cl.
CPC ....... *H04N 1/00708* (2013.01); *H04N 1/0075* (2013.01); *H04N 1/0083* (2013.01); *H04N 1/00734* (2013.01); *H04N 2201/0081* (2013.01); *H04N 2201/0082* (2013.01)

(58) Field of Classification Search
CPC ............. H04N 1/00708; H04N 1/0075; H04N 1/0083; H04N 1/0082; H04N 1/0081; H04N 1/00734
See application file for complete search history.

(56) References Cited

FOREIGN PATENT DOCUMENTS

JP   H11-242300 A   9/1999

*Primary Examiner* — Christopher Wait
(74) *Attorney, Agent, or Firm* — HEA Law PLLC

(57) ABSTRACT

An image reading apparatus includes a contact glass, a frame in a box shape, a scanner, a flat cable, and a control unit. The flat cable contains core wires and has a flat shaped flat surface. The flat cable runs inside the frame such that a width direction of the flat surface runs along a direction perpendicular to the lower surface of the contact glass. The flat cable has a side that opposes to the lower surface of the contact glass. The side includes a plurality of document detection sensors in a state where detection directions face the lower surface side of the contact glass. The plurality of document detection sensors are electrically connected to any of the core wires among the plurality of core wires contained in the flat cable, the plurality of document detection sensors outputting detection signals transmitted to the control unit via the core wires.

9 Claims, 21 Drawing Sheets

IMAGE READING APPARATUS THAT INHIBITS FLAT CABLE FROM CONTACTING CONTACT GLASS, AND IMAGE FORMING APPARATUS

INCORPORATION BY REFERENCE

This application is based upon, and claims the benefit of priority from, corresponding Japanese Patent Application No. 2016-256869 filed in the Japan Patent Office on Dec. 28, 2016, the entire contents of which are incorporated herein by reference.

BACKGROUND

Unless otherwise indicated herein, the description in this section is not prior art to the claims in this application and is not admitted to be prior art by inclusion in this section.

There is known a typical image reading apparatus that reads an image of a document placed on a contact glass. This image reading apparatus includes a plurality of document detection sensors below the contact glass on which the document is placed to identify a document size based on detection signals output from the plurality of document detection sensors.

SUMMARY

An image reading apparatus according to one aspect of the disclosure includes a contact glass, a frame in a box shape, a scanner, a flat cable, and a control unit. A document as a reading target is placed on the contact glass. The frame in the box shape supports the contact glass. The scanner includes a reading mechanism extending in a main-scanning direction inside the frame. The scanner reciprocates in a sub-scanning direction in a lower surface side in an opposite side to an upper surface where the document on the contact glass is placed. The flat cable contains a plurality of core wires. The flat cable has a flat shaped flat surface. The flat cable has one end connected to a cable port located in the scanner. The flat cable has another end connected to the frame. The flat cable runs inside the frame such that a width direction of the flat surface runs along a direction perpendicular to the lower surface of the contact glass. The control unit executes a process regarding an image reading operation performed by the image reading apparatus. The flat cable has a side that opposes to the lower surface of the contact glass. The side includes a plurality of document detection sensors in a state where detection directions face the lower surface side of the contact glass. The plurality of document detection sensors are electrically connected to any of the core wires among the plurality of core wires contained in the flat cable, the plurality of document detection sensors outputting detection signals transmitted to the control unit via the core wires. The control unit determines a size of the document placed on the contact glass based on the detection signals output from the plurality of document detection sensors.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
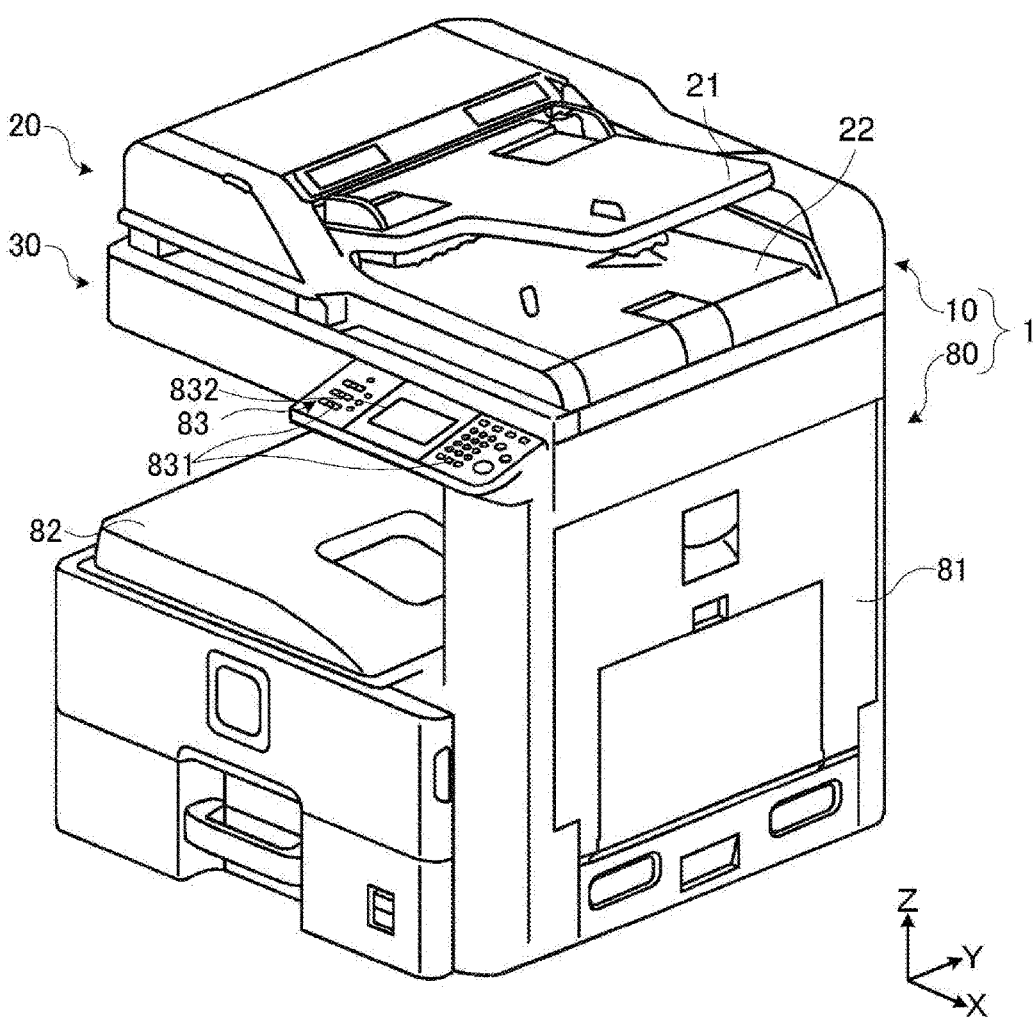
FIG. 1 obliquely illustrates an image forming apparatus including an image reading apparatus according to Embodiment 1 of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an image reading apparatus according to one embodiment of the disclosure and an image forming apparatus including the same with reference to the drawing.

Embodiment 1

Figure 2:
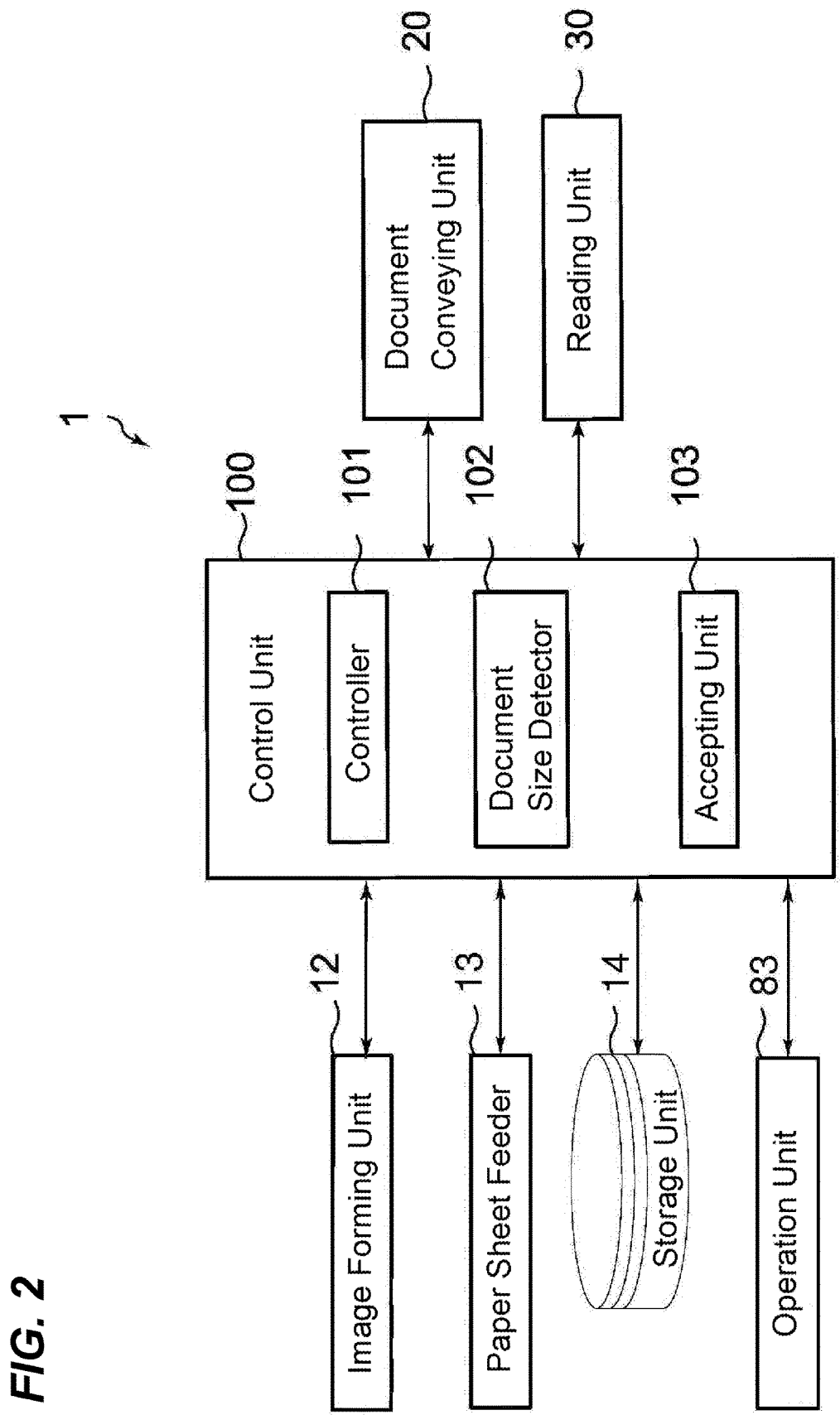
FIG. 2 illustrates a function block diagram illustrating a main internal configuration of the image forming apparatus including the image reading apparatus according to Embodiment 1.

FIG. 1 obliquely illustrates an image forming apparatus including the image reading apparatus according to Embodiment 1. FIG. 2 illustrates a function block diagram illustrating a main internal configuration of the image forming apparatus including the image reading apparatus according to Embodiment 1.

As illustrated in FIG. 1, an image forming apparatus 1 is schematically constituted of an apparatus main body 80 and an image reading apparatus 10 arranged above the apparatus main body 80.

A housing 81 that constitutes an outline of the apparatus main body 80 internally houses an image forming unit 12, a paper sheet feeder 13, and similar unit illustrated in FIG. 2. The image forming unit 12 includes, for example, a photoreceptor drum (not illustrated), a charging apparatus (not illustrated), an exposure apparatus (not illustrated), and a developing device (not illustrated). The image forming unit 12 forms a toner image of a document read by the image reading apparatus 10 onto the photoreceptor drum by processes of charging, exposure, and development. Then, the image forming unit 12 transfers the toner image onto a recording sheet fed from the paper sheet feeder 13 and discharges the recording sheet on which a fixing process is performed to a discharge tray 82.

The housing 81 of the apparatus main body 80 has a front surface in which an operation unit 83 is arranged. The operation unit 83 includes a plurality of operation keys 831 and a display 832. The plurality of operation keys 831 are, for example, a start key to instruct an execution of an image reading job. The display 832 is constituted by including a liquid crystal display (LCD) and an organic electroluminescence (OED) display.

As illustrated in FIG. 2, the housing 81 further houses a storage unit 14 and a control unit 100 internally. The storage unit 14 is a storage device with a large capacity, such as a hard disk drive (HDD), and stores image data, which is generated by the image reading apparatus 10 reading a document, and various kinds of programs. The control unit 100 is constituted of, for example, a central processing unit (CPU), a random-access memory (RAM), and a read-only memory (ROM). The control unit 100 functions as a controller 101, a document size detector 102, and an accepting unit 103 by the program stored in the above-described ROM and storage unit 14 being executed by the above-described CPU.

The controller 101 has a function to control an image forming operation performed by the image forming apparatus 1 and an image reading operation performed by the image reading apparatus 10. The document size detector 102 has a function to detect a size of a document placed on a contact glass 32 (see FIG. 3), which will be described later. The accepting unit 103 has a function to accept various kinds of instructions, such as an image formation instruction and an image reading instruction, based on, for example, a user's operation using, for example, the operation unit 83.

As illustrated in FIG. 1, the image reading apparatus 10 includes a reading unit 30 and a document conveying unit 20 arranged above the reading unit 30. The document conveying unit 20 conveys a document placed on a document placement table 21 toward the contact glass 32. The document conveyed to the contact glass 32 is read by a scanner 40 (see FIG. 3), which will be described later, at a predetermined document reading position, and then, discharged to a document discharging unit 22.

The document conveying unit 20 is located in an openable/closable manner with respect to a principal surface of the contact glass 32 and plays a role as a document pressing member that presses a document placed on the contact glass 32.

Figure 3:
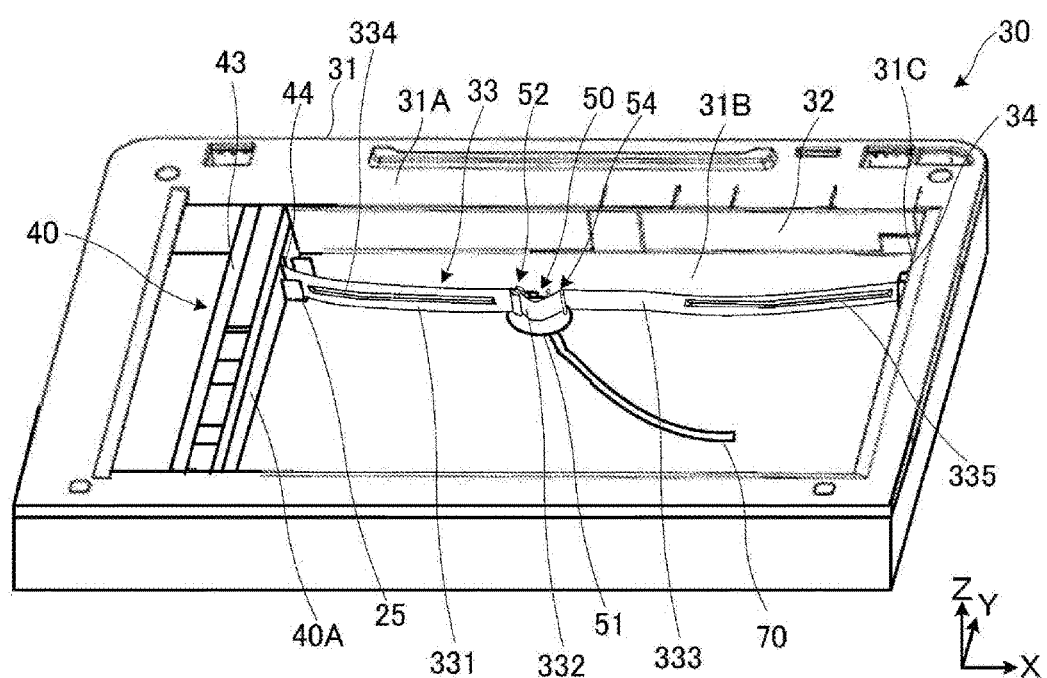
FIG. 3 obliquely illustrates a reading unit of the image reading apparatus according to Embodiment 1.

FIG. 3 obliquely illustrates the reading unit 30. As illustrated in FIG. 3, the reading unit 30 includes a box-shaped housing 31 (casing). The housing 31 has an upper surface 31A (a surface that opposes to the document conveying unit 20 in a state where the document conveying unit 20 is closed) that includes an opening. The contact glass 32 is mounted on this opening.

The contact glass 32 has a lower surface side on an opposite side of the upper surface on which a document is placed. The scanner 40 is located in the lower surface side. The scanner 40 includes a reading mechanism 43 constituted of a reading sensor of a contact image sensor (CIS) method that extends to a main-scanning direction (a Y direction in the drawing). The CIS method reading sensor has a shallow depth of field, therefore the reading mechanism 43 is in close contact with a lower surface of the contact glass 32 via a slider (not illustrated). The scanner 40 reciprocates in a sub-scanning direction (an X direction in the drawing) inside the housing 31 in this state by a driving unit (not illustrated) constituted of a motor and a gear. An example illustrated in FIG. 3 illustrates when the scanner 40 is located in a predetermined home position (an end portion in a −X direction side in the drawing). As soon as the accepting unit 103 accepts a document reading instruction, the scanner 40 moves in a +X direction in the drawing from the home position under the control of the controller 101 and reads a document placed on the contact glass 32. Then, as soon as the document reading completes, the scanner 40 moves in a −X direction in the drawing to return to a position of the home position.

The reading mechanism 43 is constituted of a light-emitting element (not illustrated) and a light receiving portion (not illustrated). The light-emitting element is constituted of, for example, a plurality of LEDs of a red LED, a green LED, and a blue LED. The light receiving portion is, for example, a complementary metal oxide semiconductor (CMOS) image sensor. The scanner 40 irradiates a document as a reading target with a light by switching three colors of lights of red, green, and blue using the light-emitting element, and receives a reflected light reflected by the document using the light receiving portion. The light receiving portion converts the received light into an electrical signal and obtains image data for one line in the main-scanning direction.

The scanner 40 is electrically connect to the control unit 100 that includes the controller 101 that controls the image reading operation by the scanner 40 via a flat cable 33. Among side surfaces of the scanner 40, a side surface 40A located in a side where a housing securing portion 34, which will be described later, is located (a +X direction side in the drawing) includes a cable port 44 that extends in a direction perpendicular to the lower surface of the contact glass 32. More specifically, the cable port 44 is located in an end portion of the side surface 40A in one side (a +Y direction) in the main-scanning direction. One end of the flat cable 33 is connected to this cable port 44. Image data obtained by the scanner 40 is transmitted to the controller 101 via the flat cable 33. In the controller 101, a various image process, such as a conversion into a digital signal, a shading correction, a gamma correction, a correction of chromatic aberration, a modulation transfer function (MTF) correction, and a scanner color correction, is performed to the image data transmitted from the scanner 40. Then, the image data generated by the image process is stored in, for example, the storage unit 14.

Not only the above-described image data, for example, an electric power to drive the scanner 40 and a control signal to control the image reading operation of the scanner 40 are transmitted to the flat cable 33.

The flat cable 33 is a ribbon shaped cable that is a plurality of core wires arranged at constant intervals being covered with a resin film. The flat cable 33 has a characteristic that can maintain an electrical characteristic even when the flat cable 33 is deformed, and is preferable as a cable to connect to the scanner 40 that reciprocates. The flat cable 33 has one end at which a socket that fits to the cable port 44 is located. Another end includes a socket that fits to a pin header (not illustrated) located in the control unit 100.

Among the side surfaces of the housing 31, a side surface 31C located in an end portion on an opposite side of the home position of the scanner 40 in a sub-scanning direction (the +X direction in the drawing) includes the housing securing portion 34 (a frame securing portion) that secures the other end of the flat cable 33 to the housing 31. The housing securing portion 34 is, for example, a clip holder and secures the other end of the flat cable 33 such that a width direction of a flat surface of the flat cable 33 runs along the direction perpendicular to the lower surface of the contact glass 32.

Figure 4A:
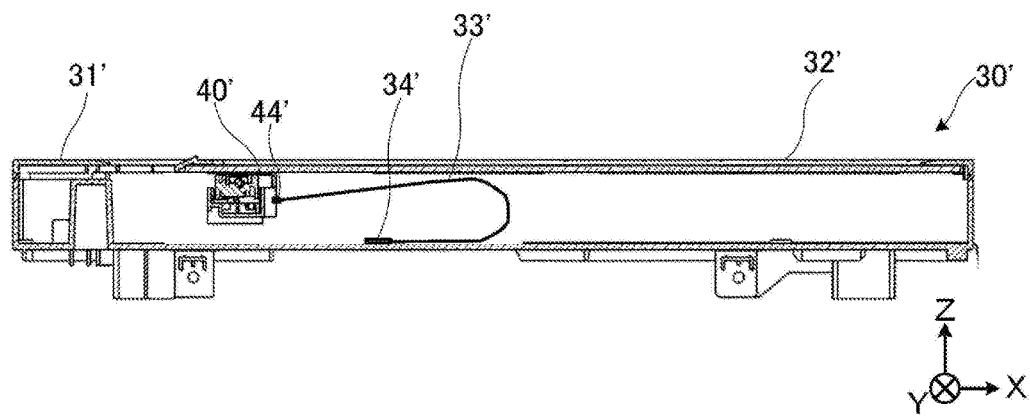
FIGS. 4A and 4B illustrate states where a flat cable deforms in a typical image reading apparatus.
Figure 4B:
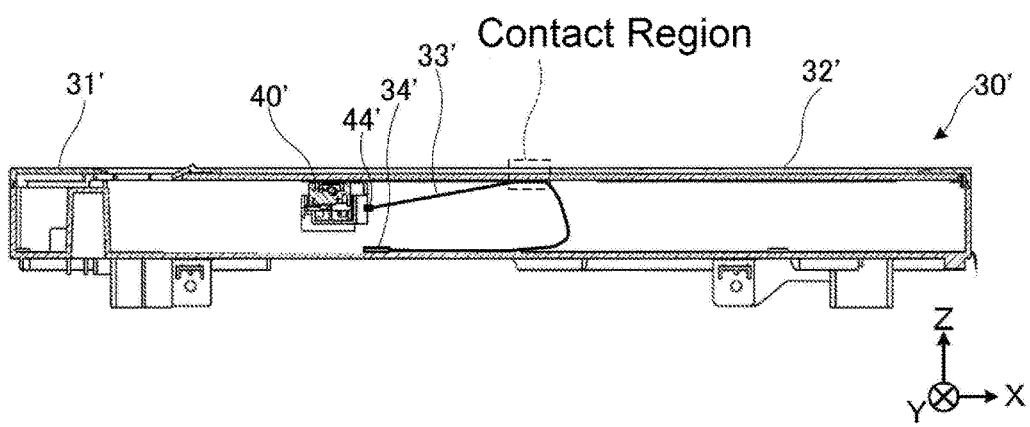

Here, in a typical image reading apparatus illustrated in FIGS. 4A and 4B, a flat cable 33' runs inside a housing 31' in a state where a flat surface of the flat cable 33' is parallel to a lower surface of a contact glass 32' because of a cable port 44' extending in a main-scanning direction and a housing securing portion 34'. In this case, depending on a position of a scanner 40', there is a possibility that the flat cable 33' expands upward (a +Z direction in the drawing) forming a large arc and curves to cause a part of the flat cable 33' to contact the contact glass 32'.

Especially, when the scanner 40' moves from a position illustrated in FIG. 4A to a position illustrated in FIG. 4B, and then, the scanner 40' is located above the housing securing portion 34', one end of the flat cable 33' and another end come close. Therefore, a part of the flat cable 33' easily contacts the contact glass 32'. The flat cable 33' contacting the contact glass 32' possibly causes the flat cable 33' to stick to the contact glass 32' and the contact glass 32' is contaminated.

In contrast to this, in the image reading apparatus 10 according to Embodiment 1, the flat cable 33 runs inside the housing 31 such that the width direction of the flat surface runs along the direction perpendicular to the lower surface of the contact glass 32. This inhibits the flat cable 33 from contacting the contact glass 32 even when the flat cable 33 deforms in association with a move of the scanner 40.

In the image reading apparatus 10 according to Embodiment 1, a sliding member 50 to guide a deformation of the flat cable 33 inside the housing 31 is located. The following describes a detailed configuration of this sliding member 50.

As illustrated in FIG. 3, the housing 31 has a lower surface 31B on which a sliding path 70 constituted of a groove depressed from the lower surface 31B is formed. The sliding path 70 is formed so as to form an arc toward a −Y direction side in the drawing and the −X direction side. In other words, the sliding path 70 is formed so as to form the arc toward another side in an opposite to one side in the main-scanning direction where the cable port 44 is located in the side surface 40A of the scanner 40 (the +Y direction in the drawing) and a side where the home position in the sub-scanning direction is located. Along this sliding path 70, the sliding member 50 is located slidingly movable on the lower surface 31B of the housing 31.

Figure 5A:
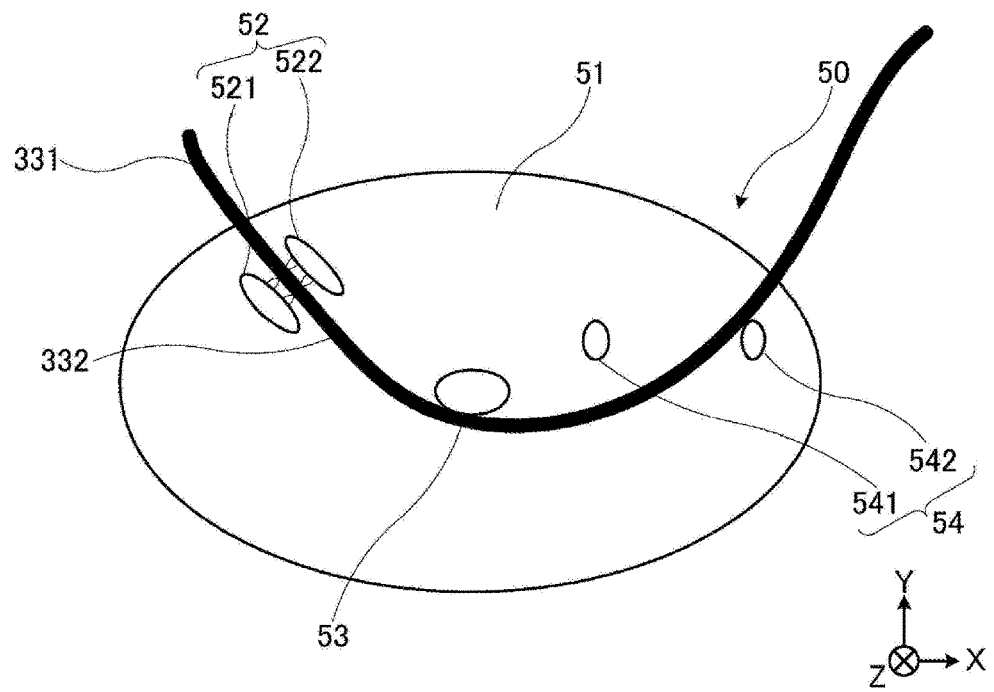
FIGS. 5A and 5B illustrate a configuration of a sliding member of the image reading apparatus according to Embodiment 1.
Figure 5B:
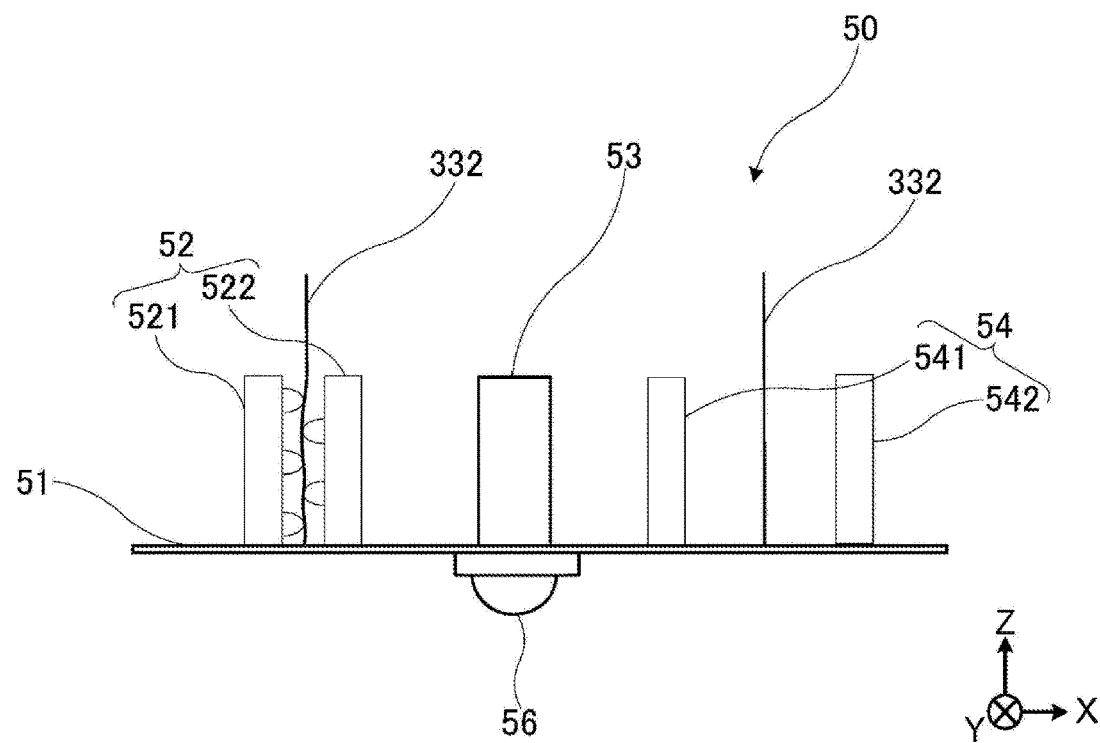

FIGS. 5A and 5B illustrate a configuration of the sliding member 50. As illustrated in these drawings, the sliding member 50 includes a plate-shaped base portion 51 having a planar surface in an ellipse shape. The base portion 51 includes a fitted portion 56 in a hemisphere shape projecting toward a side of the lower surface 31B of the housing 31 (a −Z direction in the drawing) in a center portion of a surface opposing to the lower surface 31B of the housing 31. The fitted portion 56 fitting into the groove of the sliding path 70 causes the sliding member 50 to be slidingly movable along the sliding path 70.

On a surface in an opposite side to a surface where the fitted portion 56 of the base portion 51 is formed, a lock portion 52 projecting toward the lower surface side of the contact glass 32 (the +Y direction in the drawing), a hook portion 53, and an inserting portion 54 are formed.

The lock portion 52 is constituted of a first wall portion 521 and a second wall portion 522 in columnar shapes, which are mutually opposed. Between the first wall portion 521 and the second wall portion 522, a curving portion 332 located between a first extending portion 331 extending from the one end connected to the cable port 44 and a second extending portion 333 extending from the other end secured with the housing securing portion 34 in the flat cable 33 is sandwiched. The first wall portion 521 and the second wall portion 522 include respective pluralities of protrusions on surfaces that face. The curving portion 332 is sandwiched with these protrusions, and the flat cable 33 is locked. When the flat cable 33 deforms corresponding to the reciprocation of the scanner 40, a force is transmitted from the curving portion 332 of the flat cable 33 to the lock portion 52. The force transmitted to this lock portion 52 causes the sliding member 50 to slidingly move along the sliding path 70.

The hook portion 53 is formed in a center portion on an opposite side surface to a surface where the fitted portion 56 is formed, that is, the hook portion 53 is formed in a position on an opposite side to the fitted portion 56 with the base portion 51 in between. The hook portion 53 is a columnshaped member and the curving portion 332 of the flat cable 33 is hooked around the circumference surface of the hook portion 53.

The inserting portion 54 is constituted of a third wall portion 541 and a fourth wall portion 542 in columnar shapes, which are mutually opposed. The third wall portion 541 and the fourth wall portion 542 are parallely located at an interval of a length equal to or more than a thickness of the flat cable 33. The flat cable 33 located in a side of the other end with respect to the curving portion 332 is inserted through between the third wall portion 541 and the fourth wall portion 542.

Here, since a shape of the fitted portion 56 that fits in the groove of the sliding path 70 is formed into the hemisphere shape, the sliding member 50 is slidingly movable along the sliding path 70 and is in a state where a direction in the direction along the lower surface 31B of the housing 31 is changeable with the fitted portion 56 as a center. That is, a force transmitted from the curving portion 332 of the flat cable 33 to the lock portion 52 corresponding to the reciprocation of the scanner 40 causes the sliding member 50 to slidingly move on the lower surface 31B of the housing 31 and to change the direction in the direction along the lower surface 31B.

Figure 6:
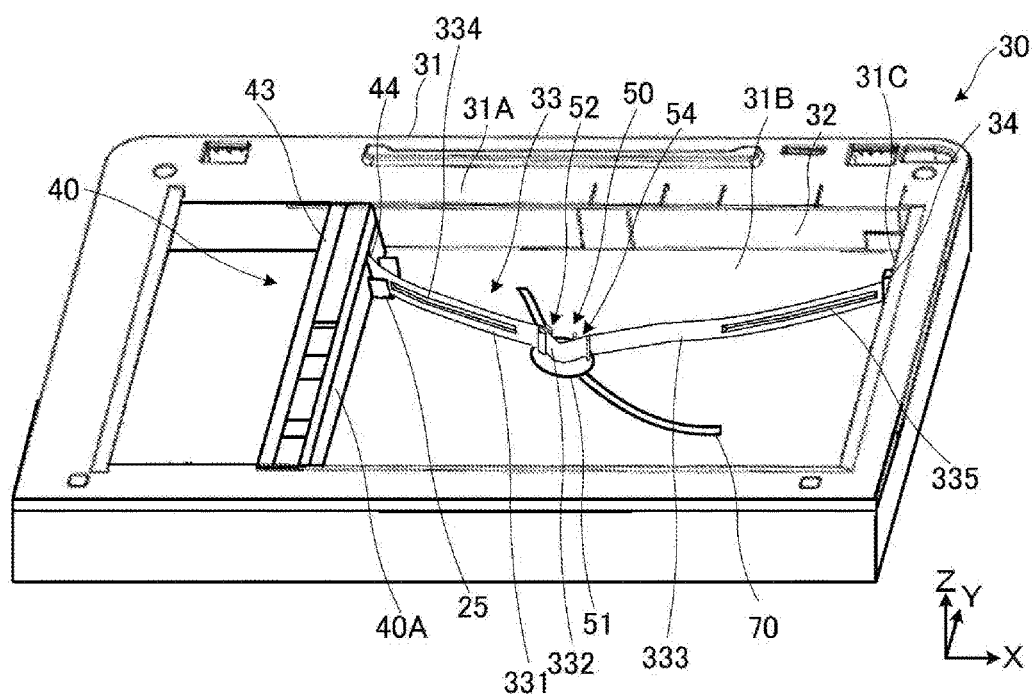
FIG. 6 illustrates a state where a scanner according to Embodiment 1 has moved from a position of a home position.

FIG. 6 illustrates a state where the scanner 40 has moved to a side where the housing securing portion 34 is located (the +X direction in the drawing) from a state where the scanner 40 illustrated in FIG. 3 is positioned in the home position. As illustrated in this drawing, when the scanner 40 moves in the +X direction in the drawing from the home position illustrated in FIG. 3, the flat cable 33 moves in the +X direction corresponding to the move of the scanner 40 in the +X direction. The flat cable 33 has a constant Young's modulus (stiffness), therefore, in the above-described move, a force in the +X direction is transmitted from the curving portion 332 of the flat cable 33 to the lock portion 52. As illustrated in FIG. 6, this force causes the sliding member 50 to move to the −Y direction side in the drawing and the −X direction side in the drawing from the position illustrated in FIG. 3 along the sliding path 70. The force in the +X direction transmitted from the curving portion 332 of the flat cable 33 described above to the lock portion 52 turns the sliding member 50 along the lower surface 31B of the housing 31 with the fitted portion 56 as a center. This changes the direction of the sliding member 50 to a direction illustrated in FIG. 6.

Figure 7A:
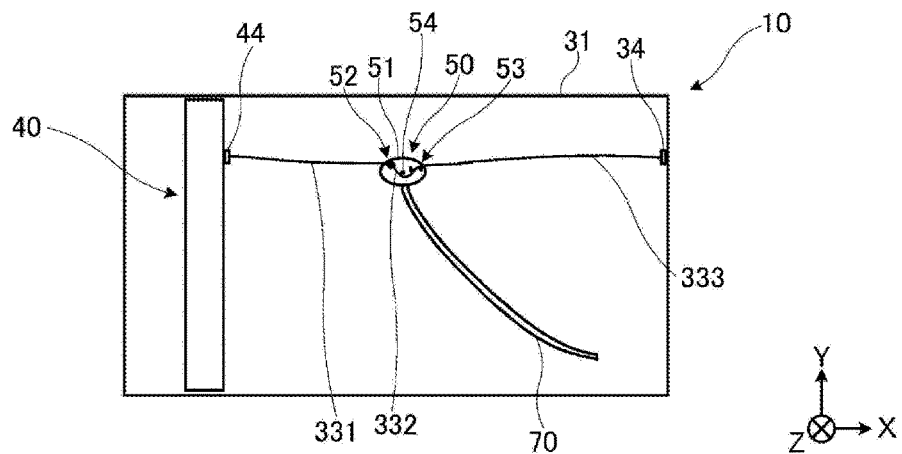
FIG. 7A illustrates a drawing viewing the reading unit illustrated in FIG. 3 from above.
Figure 7B:
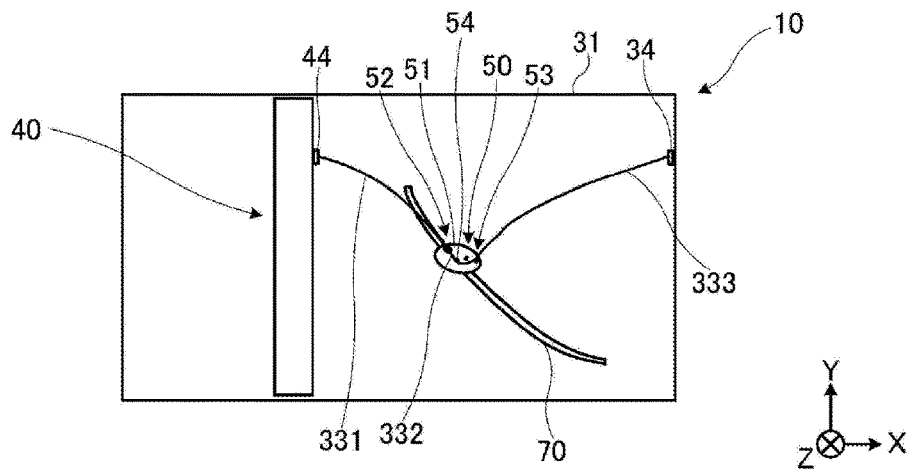
FIG. 7B illustrates a drawing viewing the reading unit illustrated in FIG. 6 from above.
Figure 7C:
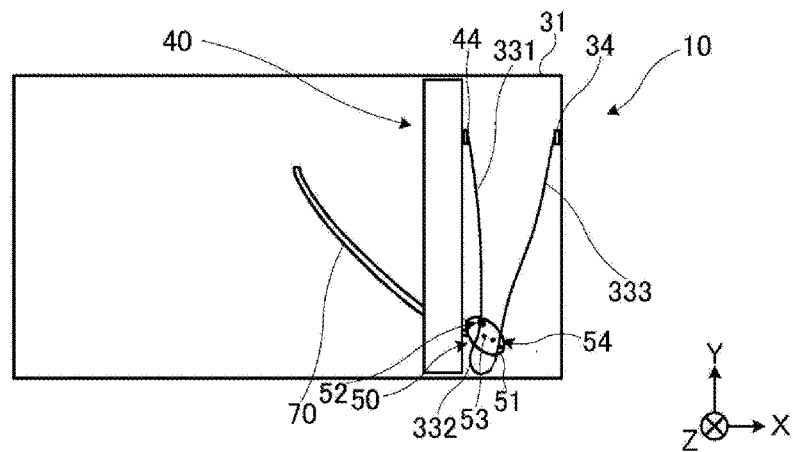
FIG. 7C illustrates a state where the scanner has moved from the position illustrated in FIG. 7B.

A further description will be given with reference to FIGS. 7A to 7C. FIG. 7A illustrates a drawing viewing the drawing illustrated in FIG. 3 from above (the +Z direction). FIG. 7B illustrates a drawing viewing the drawing illustrated in FIG. 6 from above. FIG. 7C illustrates a state where the scanner 40 has further moved to a side where the housing securing portion 34 is located (the +X direction in the drawing) from a state illustrated in FIG. 7B. As illustrated in FIG. 7C, when the scanner 40 further moves in the +X direction in the drawing from the position illustrated in FIG. 7B, the flat cable 33 moves in the +X direction and a force in the +X direction is transmitted from the curving portion 332 of the flat cable 33 to the lock portion 52. As illustrated in FIG. 7C, this force causes the sliding member 50 to further move in the −Y direction side in the drawing and the −X direction side in the drawing from the position illustrated in FIG. 7B along the sliding path 70. A force in the +X direction transmitted from the curving portion 332 of the flat cable 33 described above to the lock portion 52 further turns the sliding member 50 along the lower surface 31B of the housing 31 with the fitted portion 56 as a center.

As described above, a position and a direction of the sliding member 50 are changed in association with the move of the scanner 40. This guides a deformation (a direction and the way of curving) of the flat cable 33 inside the housing 31. For example, like a state illustrated in FIG. 7C, in a case where the scanner 40 comes close to the housing securing portion 34, the deformation of the flat cable 33 is guided such that the flat cable 33 largely expands in the −Y direction side in the drawing and curves. This inhibits the flat cable 33 from contacting the housing 31 even when the scanner 40 comes close to the housing securing portion 34.

When the sliding member 50 as described above is not located, there is a case where the flat cable 33 bends in an inappropriate direction inside the housing 31 in association with the move of the scanner 40. For example, in FIGS. 3 and 6, when the flat cable 33 expands in a +Y direction side in the drawing and curves, the flat cable 33 contacts a side surface of the housing 31. In this case, the flat cable 33 possibly gets into tangled to interfere with the move of the scanner 40. In this respect, the image reading apparatus 10 according to Embodiment 1 can guide the deformation of the flat cable 33 inside the housing 31 in an appropriate direction, thereby ensures avoiding a situation in which the flat cable 33 contacting the side surface of the housing 31 causes an interference of the move of the scanner 40.

Modification 1

Figure 8:
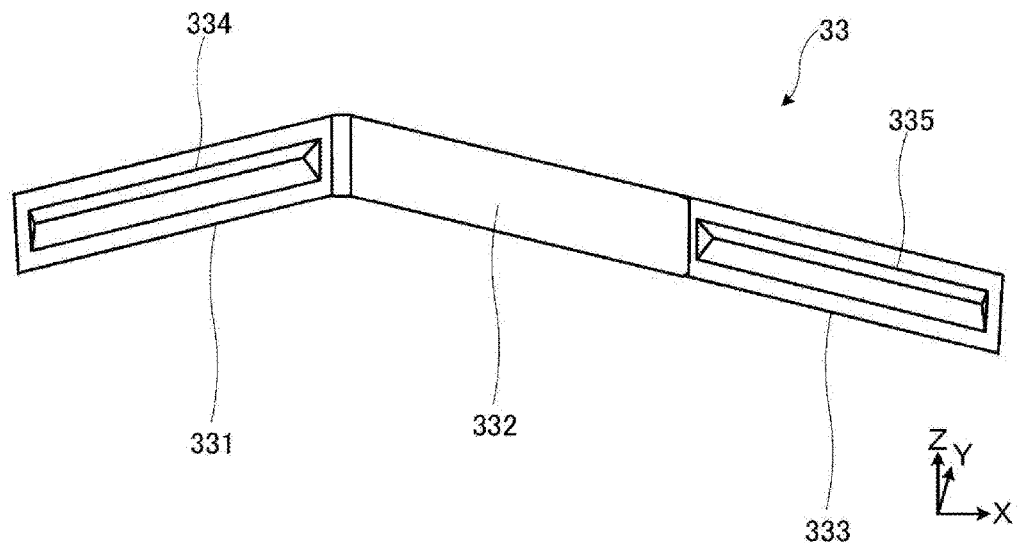
FIG. 8 illustrates a detailed configuration of the flat cable according to Embodiment 1.

FIG. 8 illustrates a detailed configuration of the flat cable 33 illustrated in FIGS. 3 and 6. As illustrated in this drawing, the flat cable 33 includes projecting portions 334 and 335 that are parts of the flat surface projecting in a direction perpendicular to the flat surface. Forming these projecting portions 334 and 335 enhances the Young's modulus of the flat cable 33 with respect to the width direction of the flat surface and makes it possible to arrange the flat cable 33 such that the width direction of the flat surface runs along the direction perpendicular to the lower surface of the contact glass 32.

The projecting portions 334 and 335 are formed by deforming the resin film of the flat cable 33 using, for example, a metallic mold. The plurality of core wires included in the flat cable 33 are parallelly located in the width direction of the flat surface (the Z direction in the drawing) avoiding the projecting portions 334 and 335. That is, while the core wires are parallelly located in an upper portion and a lower portion in the width direction of the flat cable 33 in FIG. 8, the core wires are not parallelly located in a center portion.

The projecting portion 334 is formed in the first extending portion 331 of the flat cable 33 and the projecting portion 335 is formed in a region apart from the curving portion 332 in the second extending portion 333 of the flat cable 33 by a predetermined length or more. In other words, in the curving portion 332 and the region apart from the curving portion 332 in the second extending portion 333 by less than the predetermined length, the projecting portion is not formed, thus a reinforcement process that enhances the Young's modulus is not provided.

Forming the projecting portion 335 only in the region apart from the curving portion 332 in the second extending portion 333 by the predetermined length or more, instead of forming the projecting portion 335 in all regions of the second extending portion 333, inhibits the projecting portion 335 from contacting the inserting portion 54 when the scanner 40 moves farthest to the side where the housing securing portion 34 is located (the +X direction in the drawing), that is, even when the sliding member 50 moves to an end portion of the sliding path 70 to the side where the housing securing portion 34 is located (the +X direction in the drawing). This ensures avoiding a situation in which the projecting portion 335 formed in the flat cable 33 contacting the inserting portion 54 of the sliding member 50 causes an interference of the sliding move of the sliding member 50.

Figure 9:
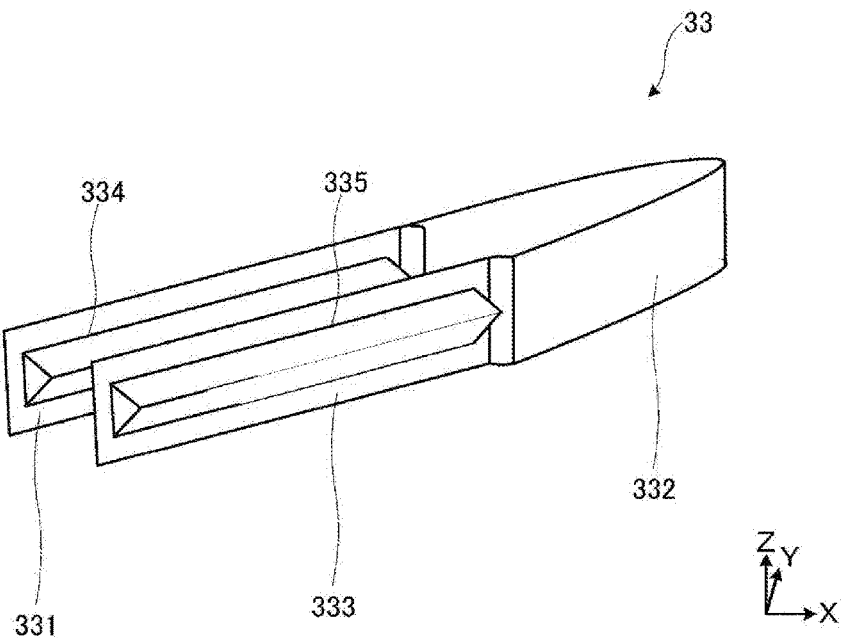
FIG. 9 illustrates a modification of a configuration of the flat cable.

FIG. 9 illustrates a configuration of a further modification of the flat cable 33. As illustrated in this drawing, the projecting portion 334 and the projecting portion 335 may be located so as to have an identical projecting direction from the flat cable 33 in a state where the curving portion 332 is curved and the flat cable 33 is folded. Then, the projecting portion 335 may be formed larger than the projecting portion 334. This causes the projecting portion 334 to be positioned within a concave portion formed in an opposite side to the projecting portion 335 and the projecting portion 334 and the projecting portion 335 are stacked in the state where the curving portion 332 is curved and the flat cable 33 is folded. This ensures housing the flat cable 33 in a further narrow region.

Figure 10:
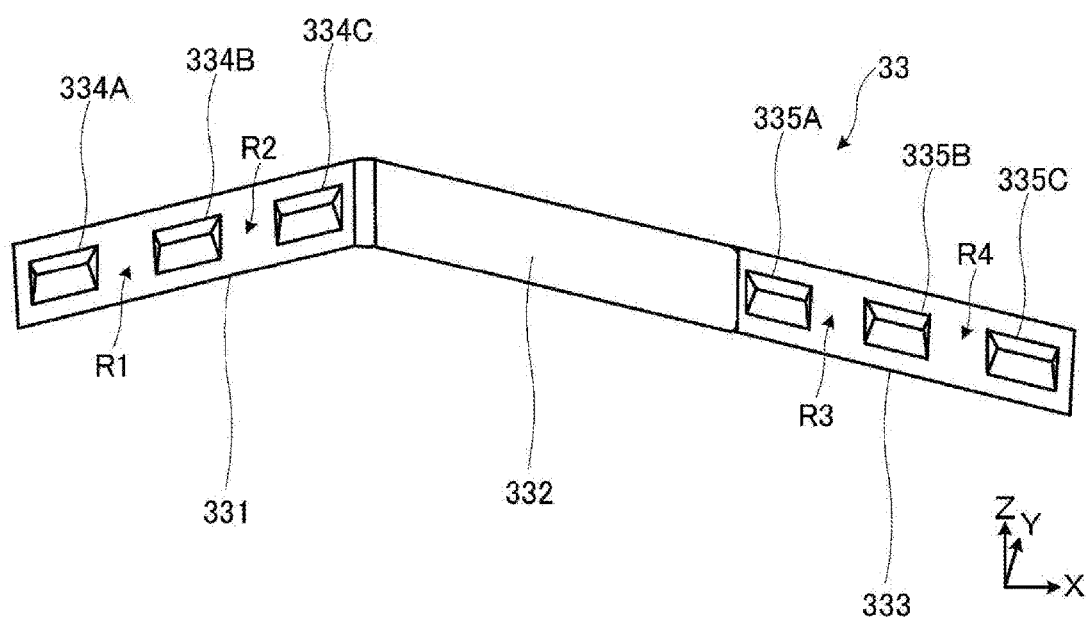
FIG. 10 illustrates a modification of a configuration of the flat cable.

FIG. 10 illustrates a configuration of a further modification of the flat cable 33. As illustrated in this drawing, a plurality of projecting portions 334A to 334C and 335A to 335C that are parts of the flat surface projecting in the direction perpendicular to the flat surface may be parallelly located in a longitudinal direction of the flat cable 33.

With this, the reinforcement process that enhances the Young's modulus is not provided in a region R1 between the projecting portion 334A and the projecting portion 334B, a region R2 between the projecting portion 334B and the projecting portion 334C, a region R3 between the projecting portion 335A and the projecting portion 335B, and a region R4 between the projecting portion 335B and the projecting portion 335C. In view of this, the flat cable 33 is curvable in these regions R1 to R4, thereby ensuring deforming the flat cable 33 in a further free manner.

The plurality of core wires included in the flat cable 33 are parallelly located in the width direction of the flat surface (the Z direction in the drawing) avoiding the above-described projecting portions 334A to 334C and 335A to 335C. That is, the core wires are parallelly located in the region of the above-described R1 to R4 in addition to the upper portion and the lower portion in the width direction of the flat cable 33 in FIG. 10.

Modification 2

Figure 11A:
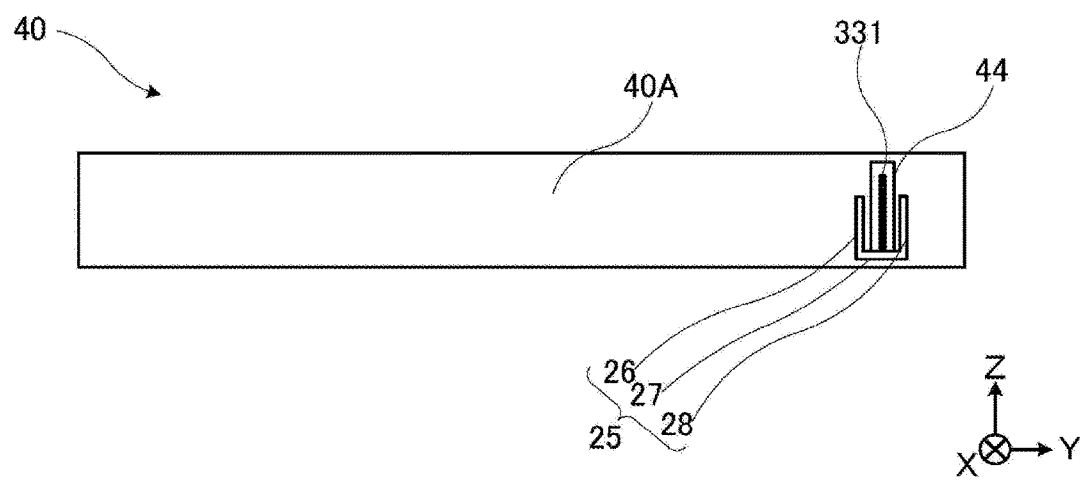
FIG. 11A illustrates a drawing viewing a scanner according to Modification 2 from a side surface side where a cable port is located.
Figure 11B:
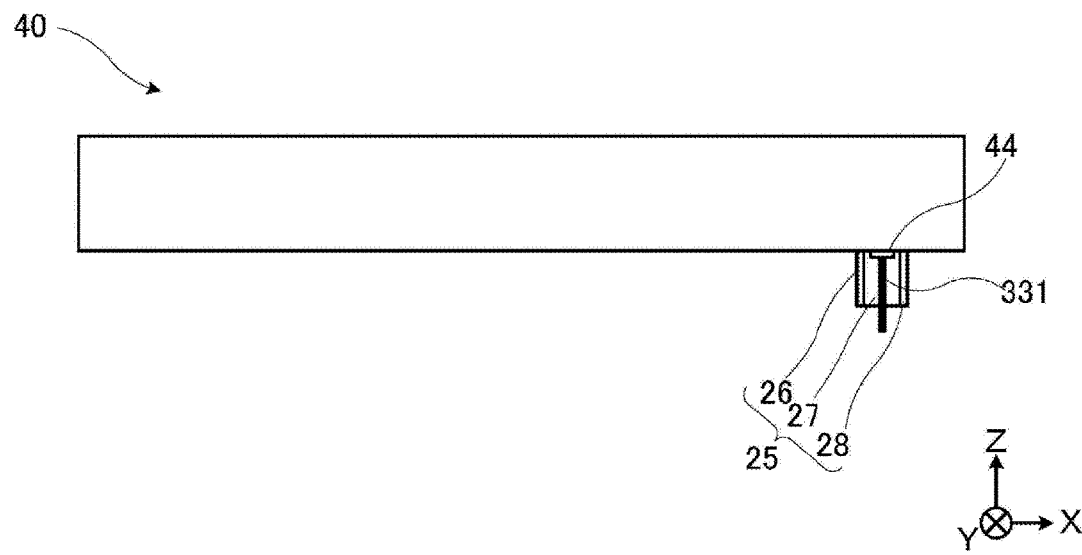
FIG. 11B illustrates a drawing viewing the scanner according to Modification 2 from above.

FIG. 11A illustrates a drawing viewing the scanner 40 illustrated in FIGS. 3 and 6 from a side of the side surface 40A where the cable port 44 is located. FIG. 11B illustrates a drawing viewing the scanner 40 illustrated in FIGS. 3 and 6 from above. As illustrated in these drawings, the side surface 40A of the scanner 40 where the cable port 44 is located includes a holding member 25 projecting toward the sub-scanning direction from a position below the cable port 44 (the −Z direction in the drawing). The holding member 25 includes a bottom wall portion 27, and a first wall portion 26 and a second wall portion 28 that project upward (the +Z direction in the drawing) from both end portions of the bottom wall portion 27 in the main-scanning direction. The first wall portion 26 and the second wall portion 28 are parallelly located mutually having intervals whose lengths are equal to or more than the thickness of the flat cable 33. The first extending portion 331 of the flat cable 33 connected to the cable port 44 is inserted through between the first wall portion 26 and the second wall portion 28. At this time, a side surface of the first extending portion 331 in the lower surface 31B side of the housing 31 (a −Z direction side in the drawing) is brought into contact with the bottom wall portion 27 of the holding member 25. Thus, the first wall portion 26, the second wall portion 28, and the bottom wall portion 27 described above hold the first extending portion 331 from the lower surface 31B side of the housing 31. This ensures avoiding a situation in which the width direction of the flat surface bends from the direction perpendicular to the lower surface of the contact glass 32 and the flat cable 33 contacts the lower surface 31B of the housing 31.

Modification 3

Figure 12:
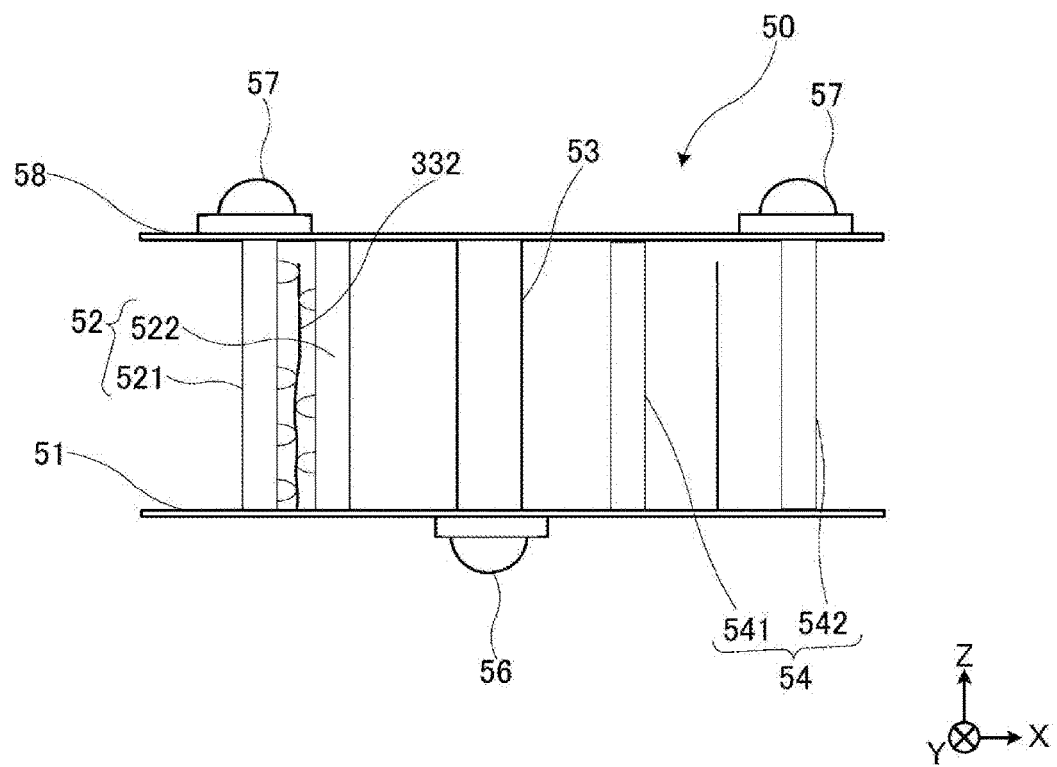
FIG. 12 illustrates a configuration of a sliding member of an image reading apparatus according to Modification 3.

FIG. 12 illustrates a configuration of the sliding member 50 according to Modification 3. The sliding member 50 according to Modification 3 includes an upper wall portion 58 above the base portion 51 (the +Z direction in the drawing) and respective members of the lock portion 52, the hook portion 53, and the inserting portion 54 between the base portion 51 and the upper wall portion 58. Then, on a surface of the upper wall portion 58 opposing to the lower surface of the contact glass 32, a plurality of abutting members 57 in hemisphere shapes projecting to the lower surface side of the contact glass 32 are formed. The sliding member 50 slidingly moves inside the housing 31 in a state where these plurality of abutting members 57 are in abutting contact with the lower surface of the contact glass 32 and the fitted portion 56 is fitted into the groove of the sliding path 70. Locating the abutting members 57 that is brought into contact with the lower surface of the contact glass 32 ensures the sliding member 50 slidingly moving in a further stable posture.

Modification 4

Figure 13A:
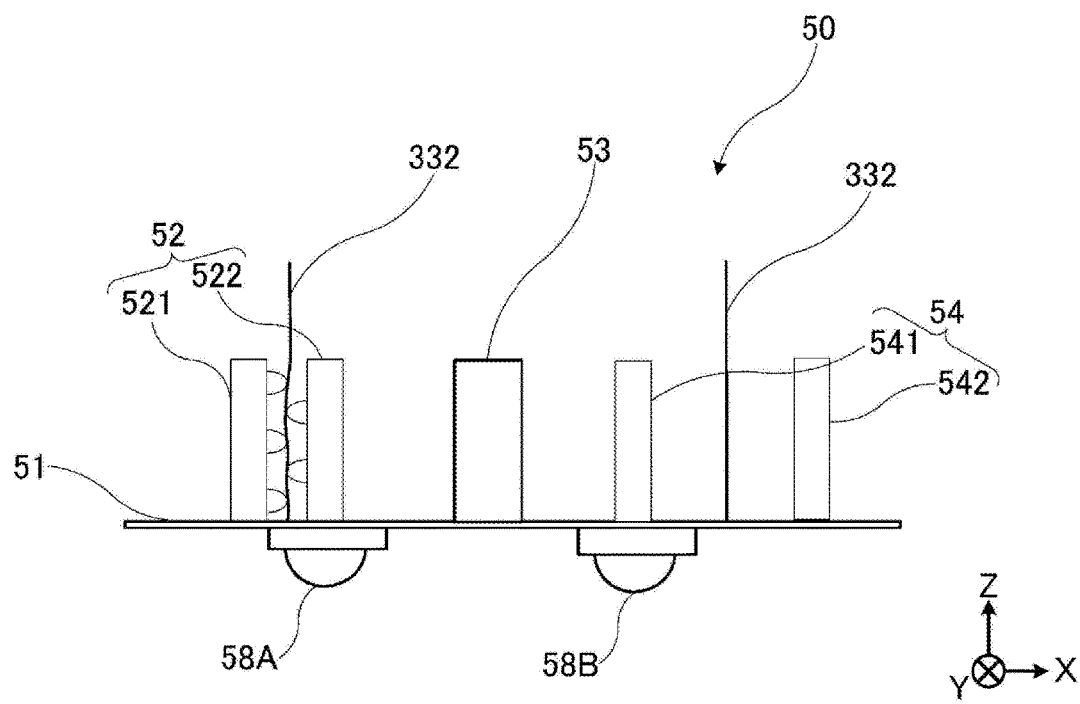
FIG. 13A illustrates a configuration of a sliding member of an image reading apparatus according to Modification 4.
Figure 13B:
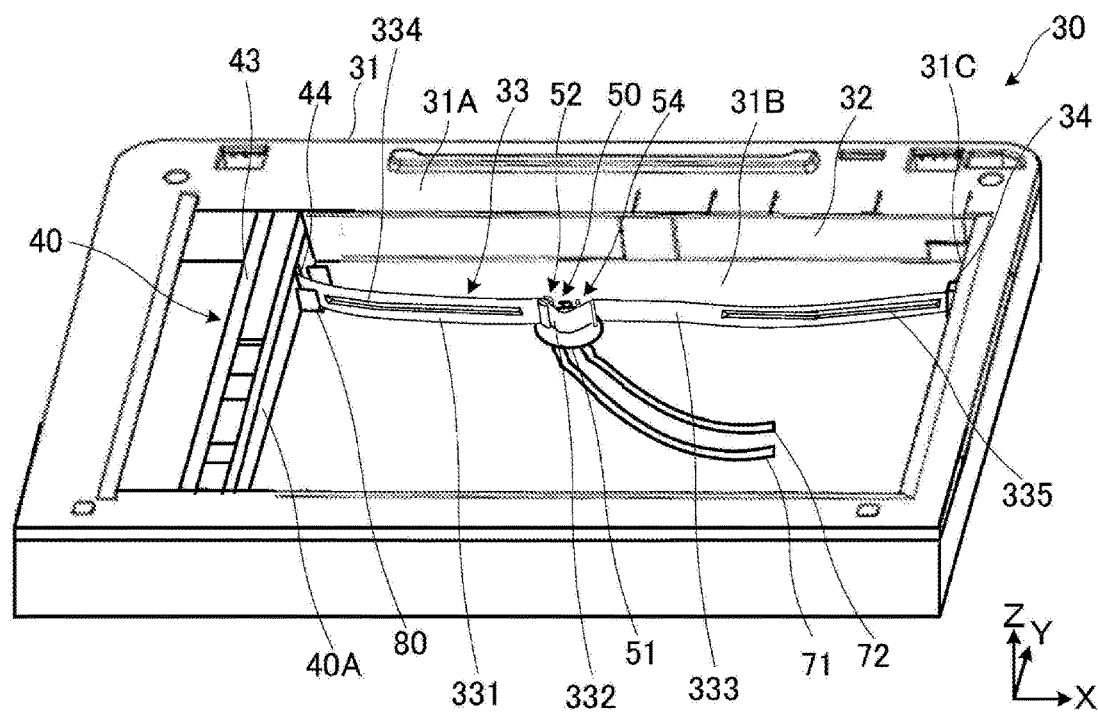
FIG. 13B illustrates a configuration of a reading unit of the image reading apparatus according to Modification 4.

FIG. 13A illustrates a configuration of the sliding member 50 according to Modification 4. As illustrated in this drawing, the sliding member 50 according to Modification 4 includes two fitted portions 58A and 58B projecting toward the lower surface 31B side of the housing 31 (the −Z direction in the drawing) on a surface of the base portion 51 opposing to the lower surface 31B of the housing 31. FIG. 13B illustrates a configuration of the reading unit 30 according to Modification 4. The reading unit 30 according to Modification 4 includes two sliding paths 71 and 72 parallelly located to one another on the lower surface 31B of the housing 31. The sliding paths 71 and 72 are both formed so as to form arcs toward the −Y direction side in the drawing and the −X direction side in the drawing. The fitted portion 58A of the sliding member 50 is fitted to this sliding path 71 and the fitted portion 58B of the sliding member 50 is fitted to the sliding path 72.

While the force transmitted from the curving portion 332 of the flat cable 33 to the lock portion 52 corresponding to the reciprocation of the scanner 40 changes the direction in the direction along the lower surface 31B of the sliding member 50, slidingly moving the sliding member 50 along the two sliding paths 71 and 72 as described above ensures regulating the direction of the sliding member 50 in a constant range. For example, a situation in which the force transmitted from the flat cable 33 causes the sliding member 50 to rotate one or more turn and the flat cable 33 gets into tangled cannot be happened. Also, the sliding member 50 can be slidingly moved in a further stable posture.

Modification 5

Figure 14A:
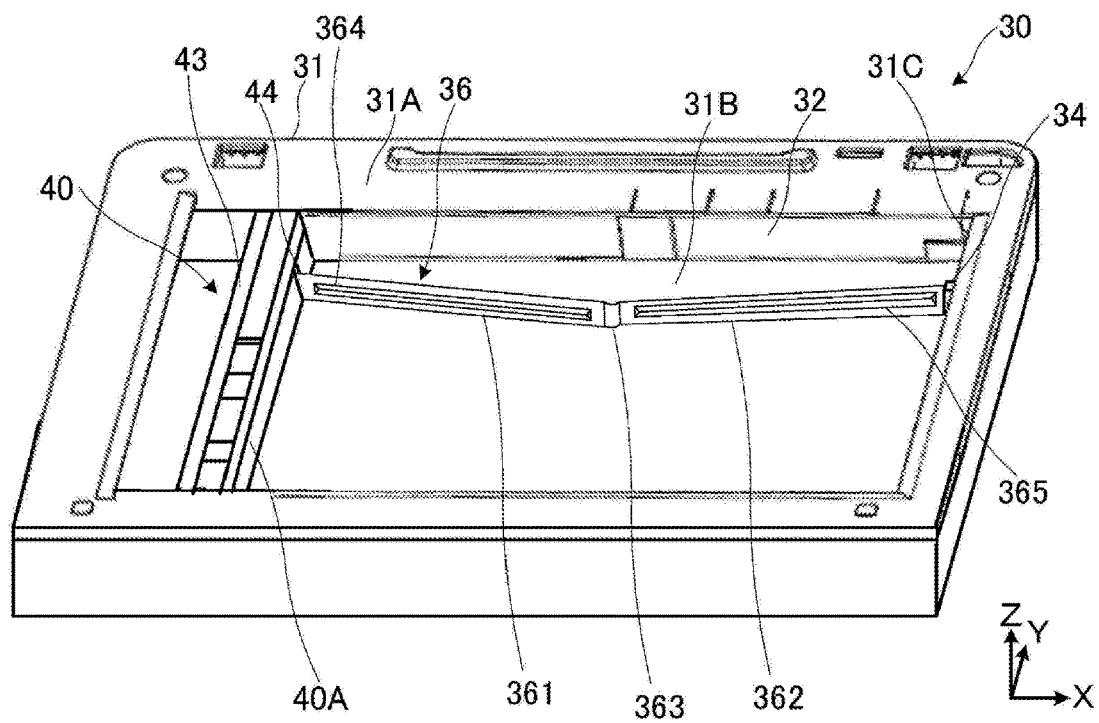
FIG. 14A illustrates a configuration of a reading unit of an image reading apparatus according to Modification 5.

FIG. 14A illustrates a configuration of the reading unit 30 according to Modification 5. As illustrated in this drawing, the reading unit 30 according to Modification 5 is different from the above-described Embodiment 1 in a shape of the flat cable. The reading unit 30 according to Modification 5 includes a flat cable 36 including a first extending portion 361, a second extending portion 362, and a curving portion 363. The first extending portion 361 extends from one end connected to the cable port 44. The second extending portion 362 extends from another end secured with the housing securing portion 34. The curving portion 363 connects the first extending portion 361 to the second extending portion 362. Then, a projecting portion 364 is formed on the first extending portion 361 in the flat cable 36 and a projecting portion 365 is formed on the second extending portion 362. On the other hand, a projecting portion is not formed on the curving portion 363, thus the reinforcement process that enhances the Young's modulus is not provided.

Figure 14B:
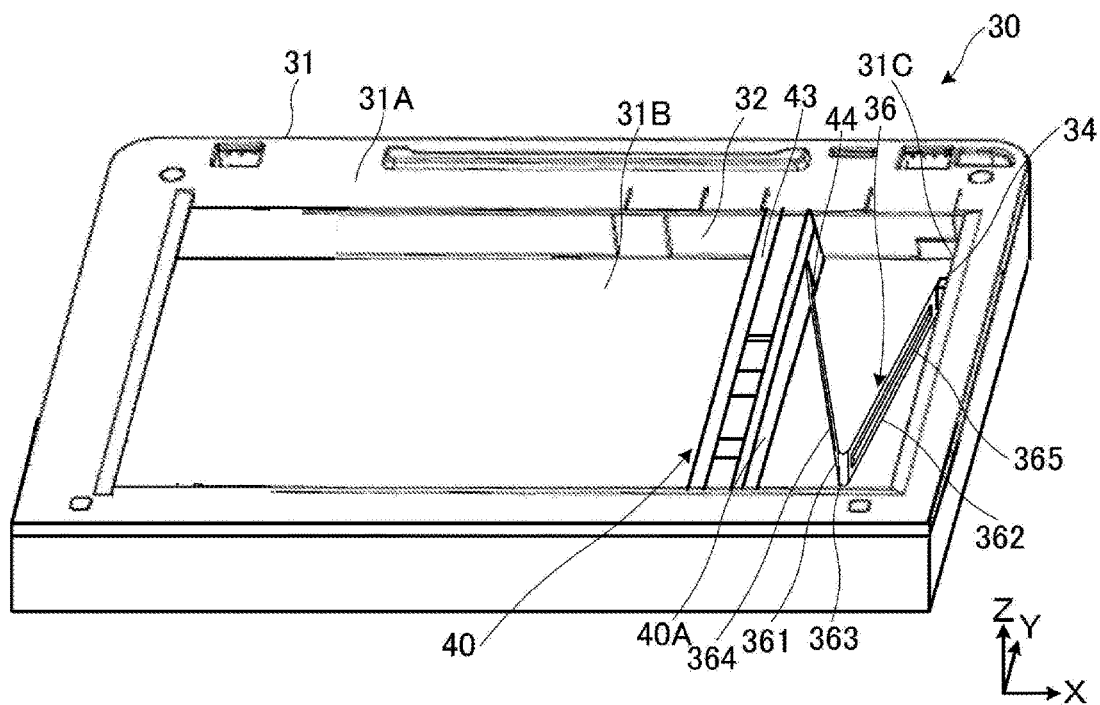
FIG. 14B illustrates a state where a scanner has moved from a state illustrated in FIG. 14A.

As illustrated in FIG. 14A, the reinforcement process is not provided and a curvable region of the curving portion 363 is narrow compared with the case of the above-described Embodiment 1. Therefore, when the scanner 40 moves in the +X direction in the drawing, the flat cable 36 deforms into an approximately V-shape as illustrated in FIG. 14B. This ensures avoiding a situation in which the flat cable 36 expands in a -Y direction in the drawing forming a large arc and curves to cause a part of the flat cable 36 to contact the side surface of the housing 31.

While it has been described the case where the reinforcement process that enhances the Young's modulus is provided by forming the projecting portions 364 and 365 in the above, the disclosure is not necessarily limited to this case. For example, the Young's modulus may be improved by attaching a sheet member (a reinforcing member) having a constant elasticity onto the first extending portion 361 and the second extending portion 362 in the flat cable 36.

Modification 6

Figure 15:
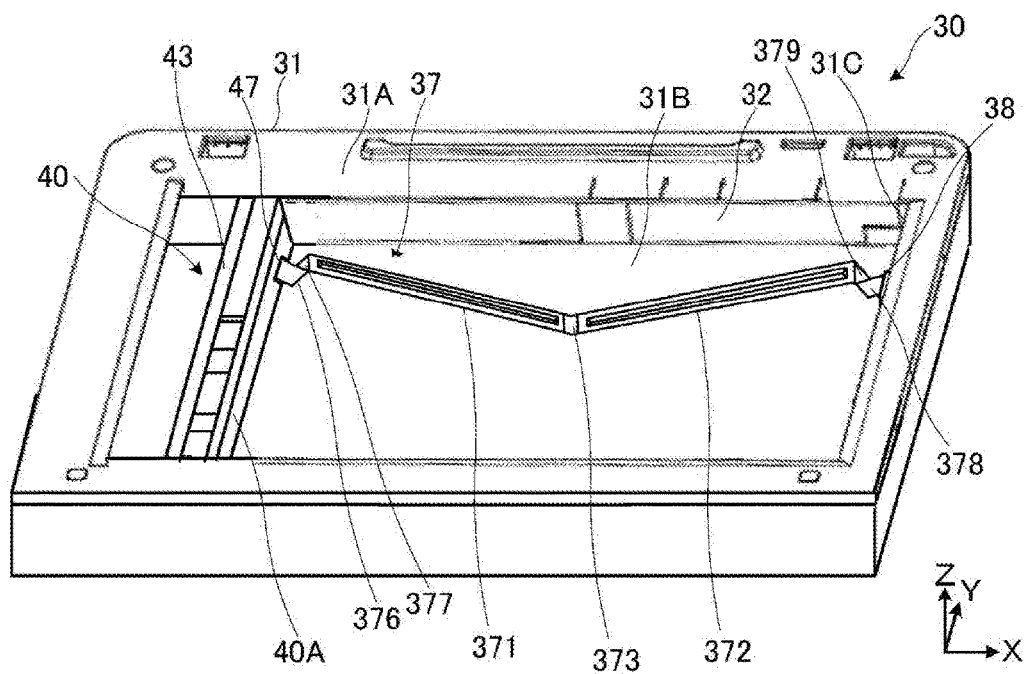
FIG. 15 illustrates a configuration of a reading unit of an image reading apparatus according to Modification 6.

FIG. 15 illustrates a configuration of the reading unit 30 according to Modification 6. As illustrated in this drawing, the reading unit 30 according to Modification 6 includes a cable port 47 that extends in the main-scanning direction in the side surface 40A of the scanner 40. In the side surfaces of the housing 31, the side surface 31C located in an end portion in an opposite side to the home position of the scanner 40 in the sub-scanning direction (the +X direction in the drawing) includes a housing securing portion 38 (frame securing portion) that secures another end of a flat cable 37 to the housing 31 such that the width direction of the flat surface runs along the main-scanning direction.

The above-described cable port 47 and the housing securing portion 38 cause the width direction of the flat surface in one end and the other end of the flat cable 37 to run along the main-scanning direction. On the other hand, in a center portion of the flat cable 37, it is preferred that the width direction of the flat surface runs along the direction perpendicular to the lower surface of the contact glass 32 in order to prevent the flat cable 37 from contacting the contact glass 32. In view of this, the reading unit 30 according to Modification 6 has a shape of the flat cable 37 in the shape illustrated in FIG. 16C. That is, the flat cable 37 includes a first folded portion 377 folded such that the width direction of the flat surface faces in a direction along the direction perpendicular to the lower surface of the contact glass 32 from a direction along the main-scanning direction in an end portion 376 that includes the one end connected to the cable port 47. The flat cable 37 includes a second folded portion 379 folded such that the width direction of the flat surface faces in the direction along the direction perpendicular to the lower surface of the contact glass 32 from the direction along the main-scanning direction in an end portion 378 that includes the other end secured to the housing securing portion 38.

Figure 16A:
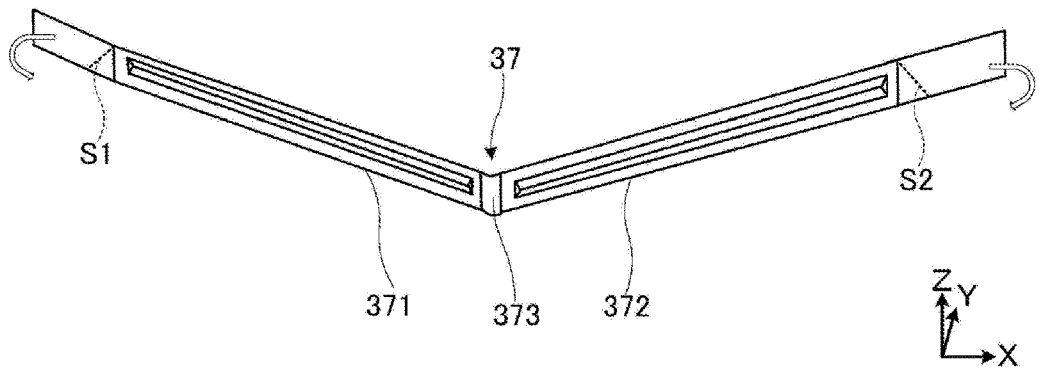
FIGS. 16A to 16C illustrate a configuration of a flat cable of the image reading apparatus according to Modification 6.
Figure 16B:
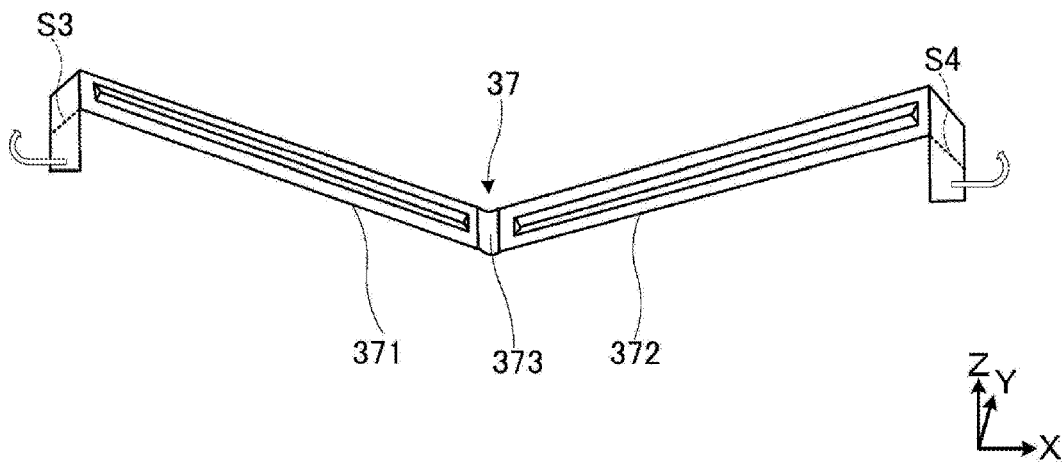
Figure 16C:
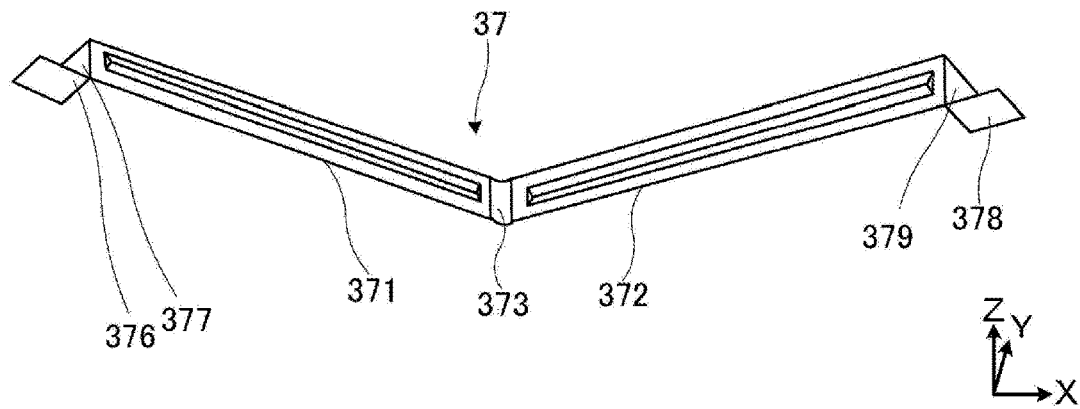

The first folded portion 377 is formed by folding the end portion of a first extending portion 371 in an arrow direction along a dotted line S1 illustrated in FIG. 16A, and then, folding in an arrow direction along a dotted line S3 illustrated in FIG. 16B. The second folded portion 379 is formed by folding the end portion of a second extending portion 372 connected via the first extending portion 371 and a curving portion 373 in an arrow direction along a dotted line S2 illustrated in FIG. 16A, and then, folding in an arrow direction along a dotted line S4 illustrated in FIG. 16B.

Thus, the reading unit 30 according to Modification 6 ensures avoiding the flat cable 37 from contacting the contact glass 32 in the configuration of the cable port and the housing securing portion extending in the main-scanning direction, which is likely to be employed in a general image reading apparatus.

Modification 7

Figure 17:
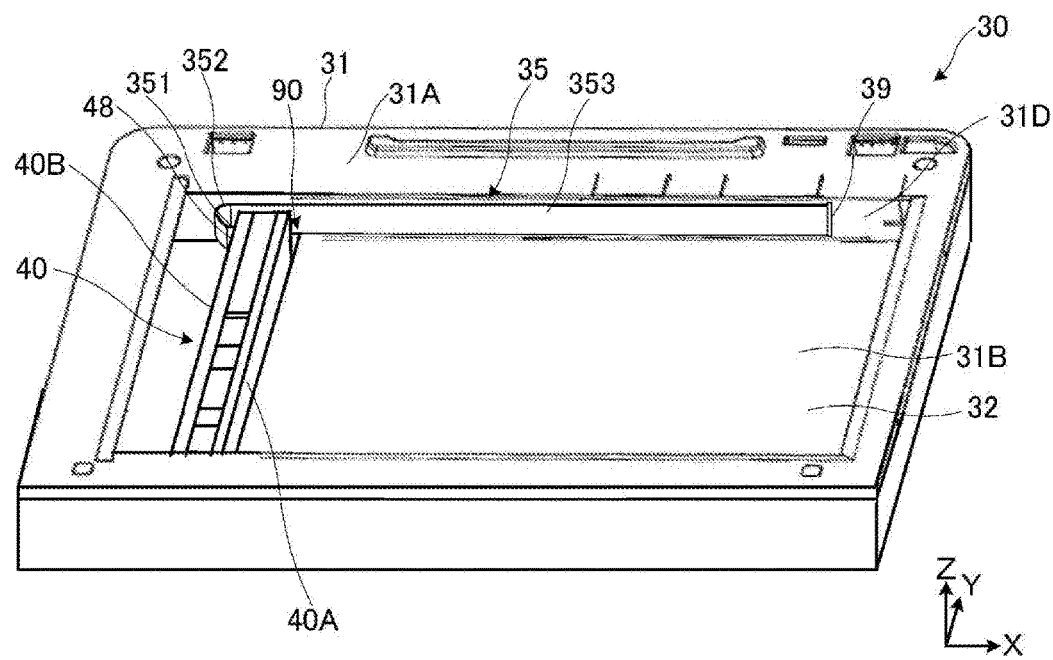
FIG. 17 illustrates a configuration of a reading unit of an image reading apparatus according to Modification 7.

FIG. 17 illustrates a configuration of the reading unit 30 according to Modification 7. As illustrated in this drawing, the reading unit 30 according to Modification 7 includes a cable port 48 that extends in the direction perpendicular to the lower surface of the contact glass 32 and to which one end of a flat cable 35 is connected in the end portion of the scanner 40 in one side in the main-scanning direction (the +Y direction in the drawing) in a side surface 40B in the -X direction side in the drawing. The housing 31 has a side surface 31D that includes a housing securing portion 39. The housing securing portion 39 secures another end of the flat cable 35 to the housing 31. The above-described cable port 48 and housing securing portion 39 cause the flat cable 35 to run inside the housing 31 such that the width direction of the flat surface runs along the direction perpendicular to the lower surface of the contact glass 32. Specifically, the flat cable 35 includes a first extending portion 351, a curving portion 352, and a second extending portion 353. The first extending portion 351 extends to the one side in the sub-scanning direction (the -X direction side in the drawing) from one end. The curving portion 352 continues to the first extending portion 351 and is folded back in the other side in an opposite side to the one side in the sub-scanning direction (the +X direction in the drawing). The second extending portion 353 continues to the curving portion 352, extends in the other side in the sub-scanning direction, and has the other end secured to the housing securing portion 39.

Figure 18:
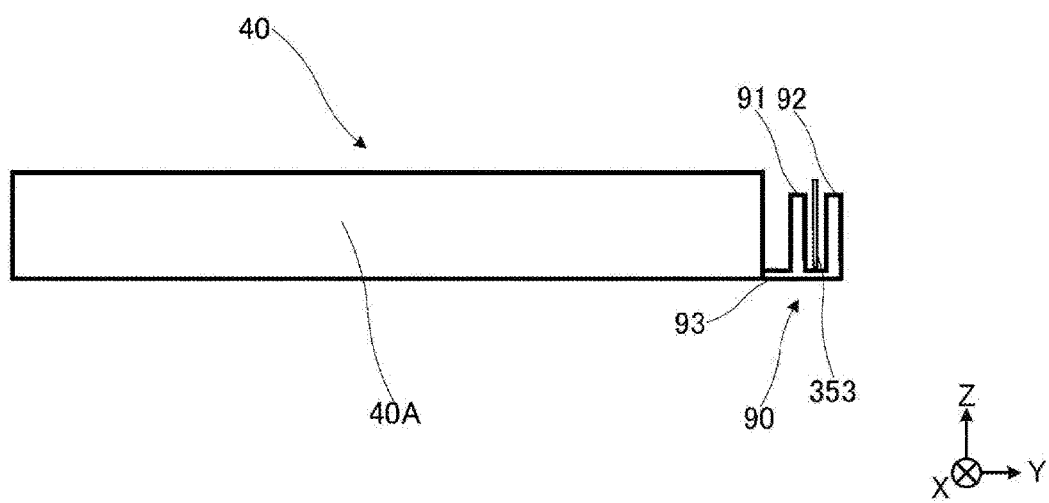
FIG. 18 illustrates a drawing viewing a scanner of the image reading apparatus according to Modification 7 from a side portion.

Here, the scanner 40 includes a holding member 90 that holds a part of the second extending portion 353 of the flat cable 35 from the lower surface 31B side of the housing 31 on the one side in the main-scanning direction (the +Y direction in the drawing). The holding member 90 is secured to a side surface of the scanner 40 and reciprocates inside the housing 31 integrally with the scanner 40. FIG. 18 illustrates a side view of the scanner 40 viewed from the +X direction side. As illustrated in this drawing, the holding member 90 includes a bottom wall portion 93, and a first wall portion 91 and a second wall portion 92 that project in the lower surface side of the contact glass 32 from the bottom wall portion 93. The first wall portion 91 and the second wall portion 92 are parallelly located at an interval of a length equal to or more than a thickness of the flat cable 35. The second extending portion 353 in the flat cable 35 is inserted through between the first wall portion 91 and the second wall portion 92. At this time, a side surface of the second extending portion 353 in the lower surface 31B side of the housing 31 (the -Z direction side in the drawing) is brought into contact with the bottom wall portion 93 of the holding member 90. Thus, the first wall portion 91, the second wall portion 92, and the bottom wall portion 93 described above hold the second extending portion 353 from the lower surface 31B side of the housing 31. This ensures avoiding a situation in which the width direction of the flat surface bends from the direction perpendicular to the lower surface of the contact glass 32 and the flat cable 35 contacts the lower surface 31B of the housing 31.

Figure 19A:
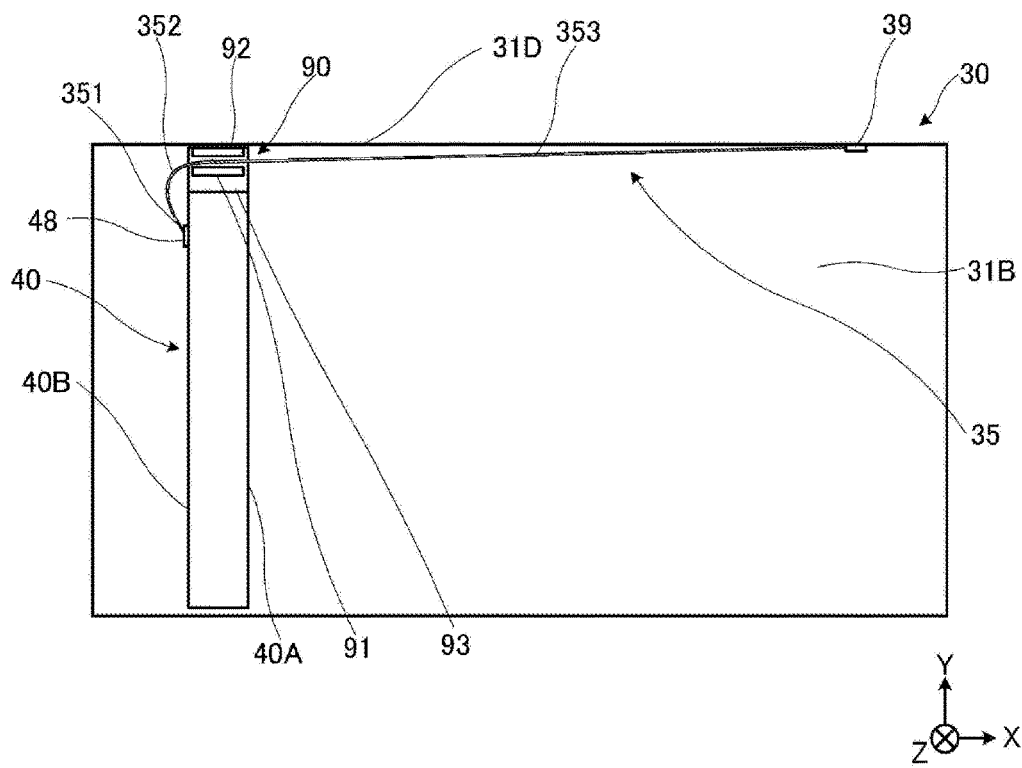
FIGS. 19A and 19B illustrate drawings viewing the scanner of the image reading apparatus according to Modification 7 from above.
Figure 19B:
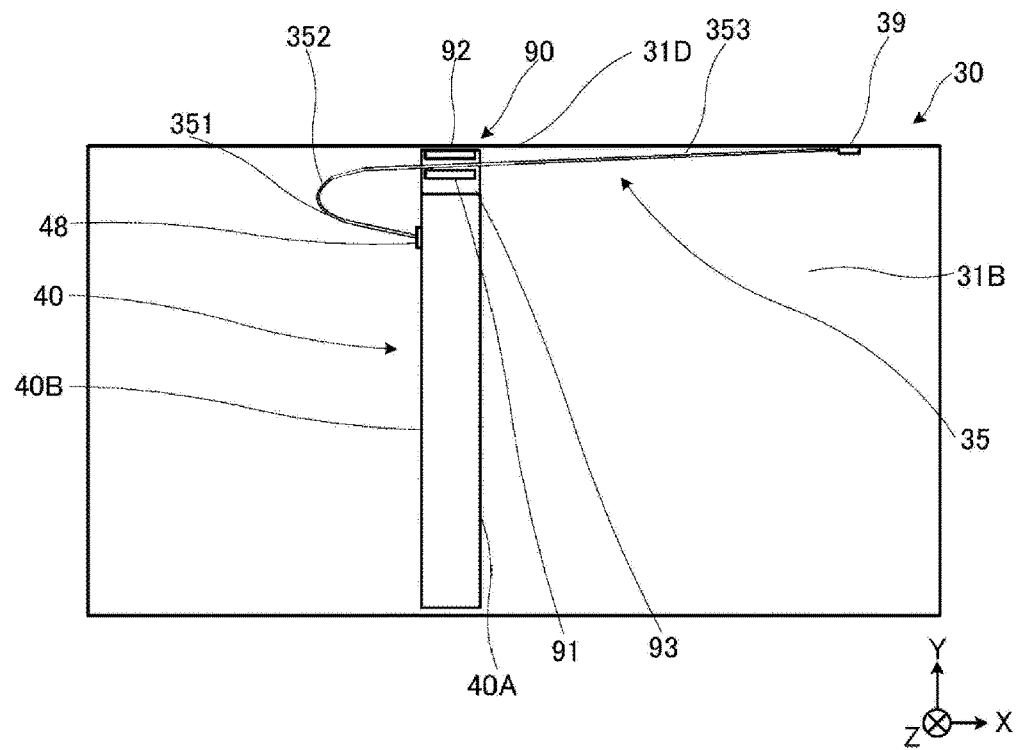

The holding member 90 plays a role to guide a deformation of the flat cable 35. FIG. 19A illustrates the reading unit 30 when the scanner 40 is located in the home position. When the scanner 40 moves in the +X direction in the drawing from this state, the flat cable 35 deforms as illustrated in FIG. 19B. Since the second extending portion 353 is inserted through the first wall portion 91 and the second wall portion 92 of the holding member 90, the flat cable 35 is difficult to contact the side surface 31D of the housing 31. When the holding member 90 is not located, the flat cable 35 deforms in a state where the flat cable 35 is in contact with the side surface 31D of the housing 31. Therefore, a friction force is generated between the side surface 31D of the housing 31 and the flat cable 35, and this friction force possibly interferes with the reciprocation of the scanner 40. In this respect, with the reading unit 30 according to Modification 7, the flat cable 35 is difficult to contact the side surface 31D of the housing 31 and the above-described friction force is not generated between the side surface 31D of the housing 31 and the flat cable 35. Therefore, the reciprocation of the scanner 40 is not interfered with.

The holding member 90, as described above, is secured to the side surface of the scanner 40 and reciprocates inside the housing 31 integrally with the scanner 40. A reciprocating range of the holding member 90 is a range below the contact glass 32 (the −Z direction in the drawing) inside the housing 31. In other words, the holding member 90 is located so as not to be positioned in a position below the upper surface 31A inside the housing 31. This makes the holding member 90 viewable through the contact glass 32 without being obstructed by the upper surface 31A of the housing 31 from above (the +Z direction in the drawing).

Here, when the flat cable 35 comes off from the holding member 90, maintenance is necessary. In this respect, since the holding member 90 is located in the position viewable from above as described above, a user can easily find, for example, when the flat cable 35 is off from the holding member 90.

Embodiment 2

Figure 20:
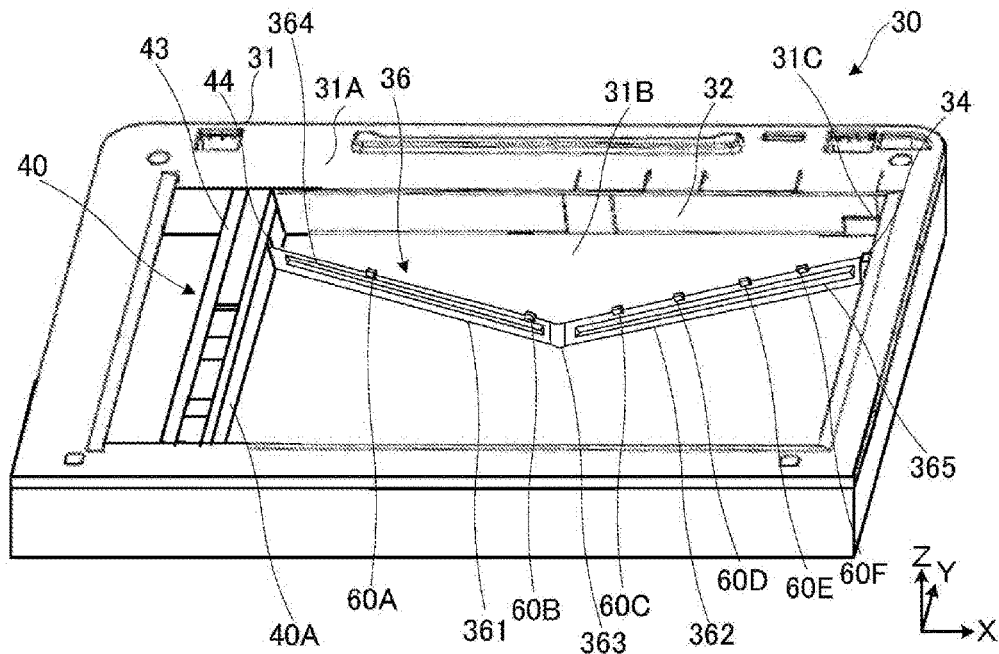
FIG. 20 illustrates a configuration of a reading unit of an image reading apparatus according to Embodiment 2.
Figure 21:
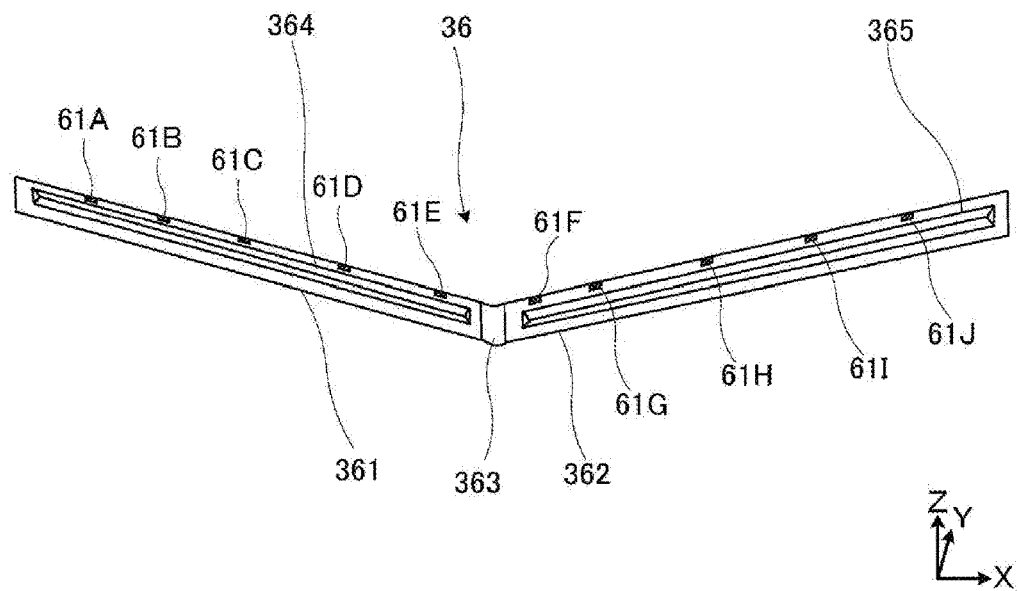
FIG. 21 illustrates a configuration of a flat cable of the image reading apparatus according to Embodiment 2.
Figure 22:
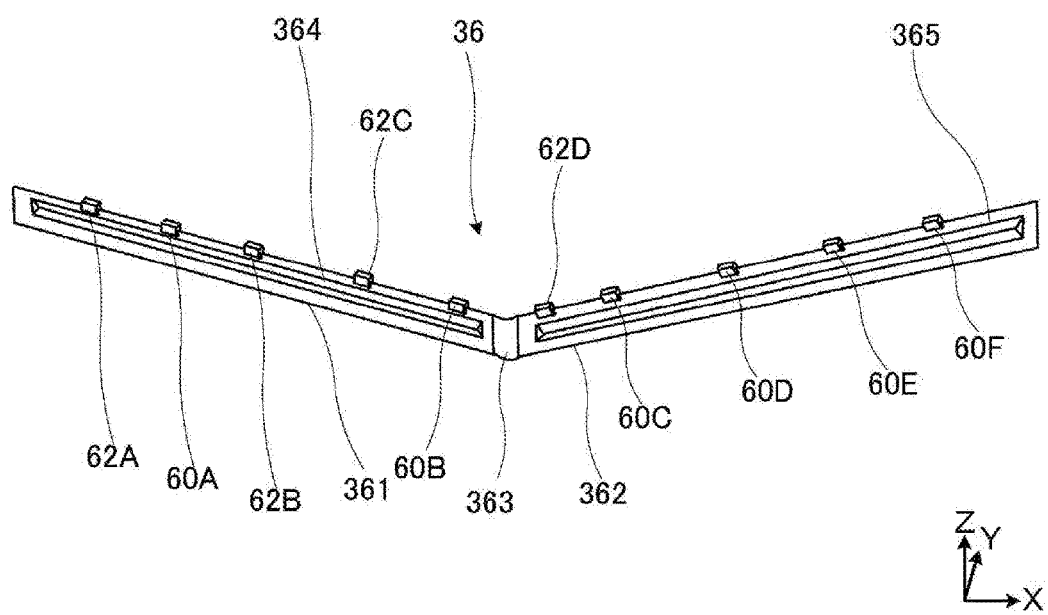
FIG. 22 illustrates the configuration of the flat cable of the image reading apparatus according to Embodiment 2.

FIG. 20 illustrates a configuration of the reading unit 30 according to Embodiment 2. FIGS. 21 and 22 illustrate a configuration of the flat cable 36 according to Embodiment 2.

As illustrated in FIG. 21, the reading unit 30 according to Embodiment 2 includes a plurality of cutout portions 61A to 61J that are parts of a film of the flat cable 36, and the flat cable 36 is notched in a side of the flat cable 36 that opposes to the lower surface of the contact glass 32. These cutout portions 61A to 61J expose a part of the core wires among the plurality of core wires contained in the flat cable 36. As illustrated in FIG. 22, a part of cutout portions among the cutout portions 61A to 61J includes a plurality of document detection sensors 60A to 60F in a state where detection directions toward the lower surface side of the contact glass 32. Specifically, the cutout portions 61B, 61E, 61G, 61H, 61I, and 61J among the cutout portions 61A to 61J include the document detection sensors 60A to 60F. On the other hand, the cutout portion 61A, 61C, 61D, and 61F without the document detection sensors 60A to 60F include respective protective covers 62A to 62D. The protective covers 62A to 62D are constituted of, for example, resin that has an insulation property and play roles to protect the core wires exposed from the cutout portions.

While details will be described below, detectable sizes of documents differ by positions of the document detection sensors 60A to 60F. Sizes of documents that are desired to be detected differ by types of the image reading apparatuses. In view of this, it is necessary to change positions where the document detection sensors 60A to 60F are arranged corresponding to the size of the document that is desired to be detected when the image reading apparatus 10 is manufactured. In this respect, the above-described configuration ensures locating the document detection sensor 60 at a cutout portion located in a desired position among the cutout portions 61A to 61J formed in the flat cable 36 and locating the protective covers 62 at the cutout portions located in positions other than the desired position. This ensures detecting the size of the document in the desired size by locating the document detection sensor 60 at the desired position without locating the flat cable 36 that differs by the type of the image reading apparatus. The document detection sensors 60A to 60F all have an identical configuration. Hereinafter, when no explanation with a distinction is specifically made, "A," "F," and similar alphabetical reference are omitted to explain as the document detection sensor 60.

The document detection sensor 60 is what is called a reflection type sensor and includes a light emitting element and a light receiving element. The light emitting element is, for example, an infrared-emitting diode, which emits an infrared light. The light emitting element has a main emission direction arranged toward the contact glass 32 and emits the infrared light toward the document placed on the contact glass 32. The light receiving element is a light receiving element, such as a photodiode and a phototransistor. The light receiving element has a main light reception direction arranged toward the contact glass 32 and receives the infrared light reflected by the contact glass 32 or the document placed on the contact glass 32.

The document detection sensors 60 are electrically connected to any of the core wires among the plurality of core wires contained in the flat cable 36 in the respective cutout portions 61A to 61J. A detection signal output from the document detection sensor 60 is transmitted to the control unit 100 via the core wires contained in the flat cable 36. The detection signal output from the document detection sensor 60 is a signal indicating an intensity of the infrared light received by the light receiving element. The document size detector 102 of the control unit 100 detects that the document exists above the document detection sensor 60 and the infrared light emitted by the light emitting element is reflected by the document when the intensity of the infrared light indicated by the detection signal is equal to or more than a predetermined intensity. Then, based on the respective detection signals output from the plurality of document detection sensors 60, the document size detector 102 detects whether the document exists above the respective document detection sensors 60 or not to determine the size of the document placed on the contact glass 32.

Figure 23:
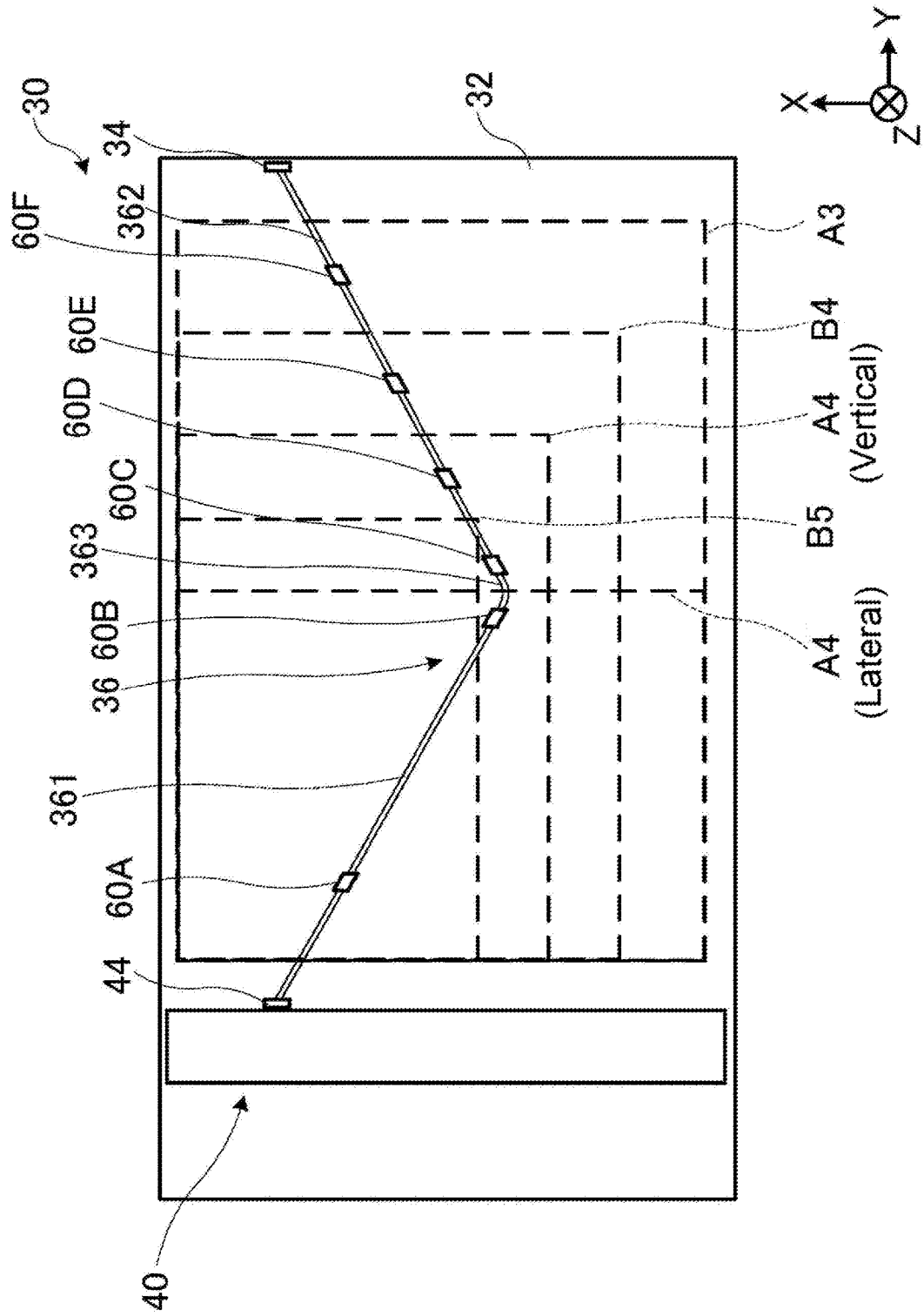
FIG. 23 illustrates a drawing viewing the reading unit from above when a scanner is located in a home position in the image reading apparatus according to Embodiment 2.

The document detection sensors 60A to 60F are each located in the flat cable 36 so as to be located below a predetermined position of the contact glass 32. FIG. 23 illustrates a drawing viewing the reading unit 30 from above when the scanner 40 is located in the home position. In the drawing, dotted lines indicate the respective sizes of the documents placed on the contact glass 32. The document size detector 102 determines the document size placed on the contact glass 32 based on the detection signal output from the plurality of document detection sensors 60 when the scanner 40 is located in the home position.

Figure 24:
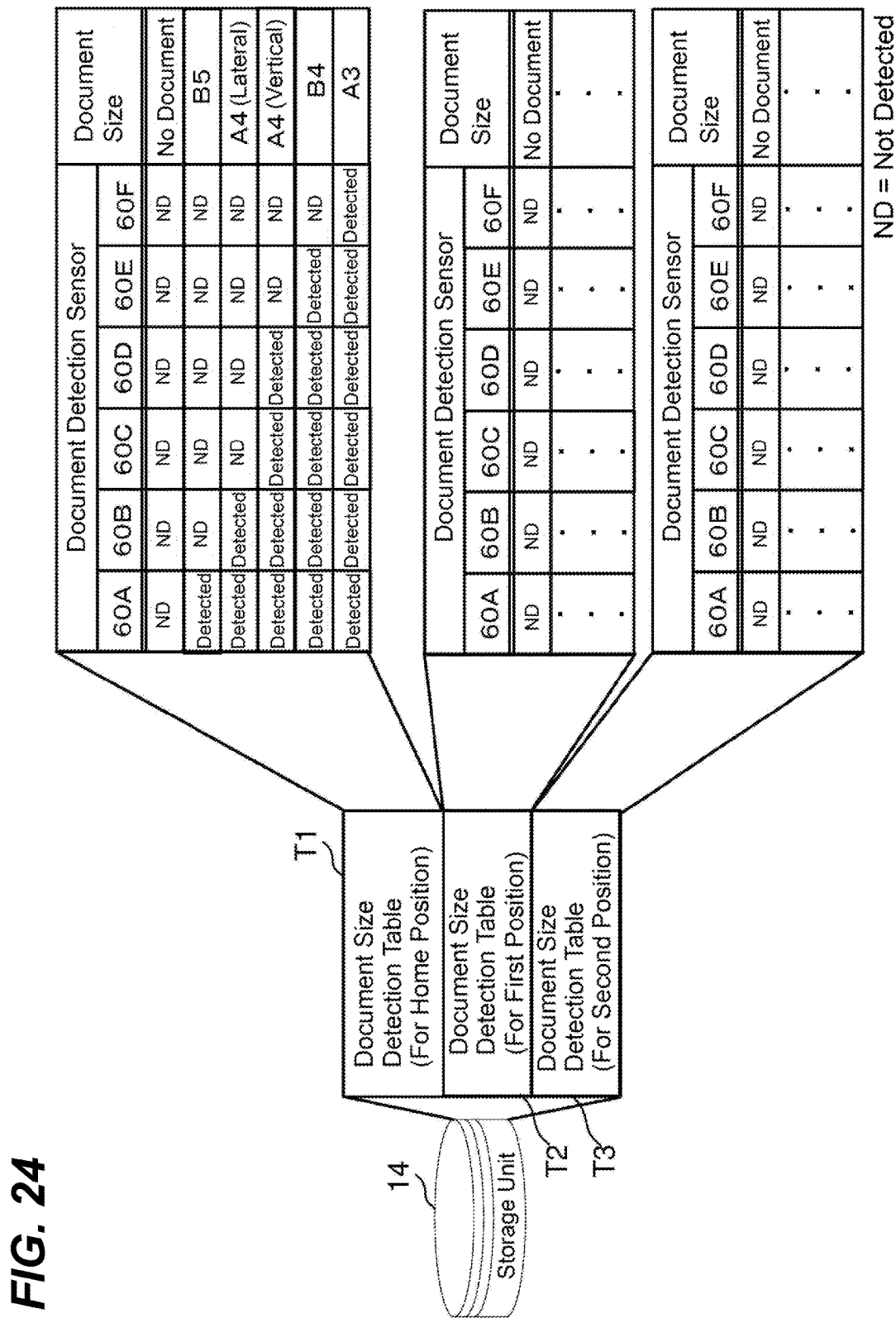
FIG. 24 illustrates exemplary data stored in a storage unit of the image reading apparatus according to Embodiment 2.

Here, as illustrated in FIG. 24, the storage unit 14 stores document size detection tables. A document size detection table T1 indicates relationships between outputs of the detection signals of the document detection sensors 60A to 60F and the document sizes when the scanner 40 is located in the home position. The document size detector 102 determines the document size placed on the contact glass 32 in accordance with this document size detection table T1. For example, when all the sensors of the document detection sensors 60A to 60F output the detection signals to indicate that the document exists above, the document size detector 102 detects that the document in A3 size is placed on the contact glass 32. For example, when the sensors of the document detection sensors 60A to 60D output the detection signals to indicate that the document exists above and the sensors of the document detection sensors 60E and 60F output the detection signals to indicate that the document does not exist, the document size detector 102 detects that the document in A4 (vertical) size is placed on the contact glass 32. Thus, the document size detector 102 ensures detecting the documents in the respective document sizes from A3 size to B5 size based on the detection signals output from the document detection sensors 60A to 60F.

As described above, the image reading apparatus 10 according to Embodiment 2 ensures simplifying a wiring structure inside the apparatus since the detection signal output from the document detection sensor 60 can be transmitted to the control unit 100 using the flat cable 36 by locating the document detection sensors 60 in the flat cable 36. The image reading apparatus 10 according to Embodiment 2 ensures locating the document detection sensor 60 in a state where the detection direction faces the lower surface side of the contact glass 32 since the flat cable 36 is arranged such that the width direction of the flat surface runs along the direction perpendicular to the lower surface of the contact glass 32.

Modification

As illustrated in FIG. 24, a plurality of document size detection tables T1 to T3 are stored in the storage unit 14. The document size detection table T2 indicates relationships between outputs of the detection signals of the document detection sensors 60A to 60F and the document sizes when the scanner 40 is located in a first position that is away from the home position by a predetermined distance. The document size detection table T3 indicates relationships between outputs of the detection signals of the document detection sensors 60A to 60F and the document sizes when the scanner 40 is located in a second position that is away from the home position by a predetermined distance.

The document size detector 102, first identifies the document size based on the detection signals output from the document detection sensors 60A to 60F when the scanner 40 is located in the home position. At this time, there is a case where the document size cannot be specified depending on output values of the detection signals of the document detection sensors 60A to 60F. For example, when the document detection sensors 60A to 60C output the detection signals to indicate that the document exists above and the document detection sensors 60D to 60E output the detection signals to indicate that the document does not exist above, the document size cannot be identified even though the document size detection table T1 is referred. In this case, the document size detector 102 moves the scanner 40 from the home position to the predetermined first position. As soon as the scanner 40 moves to the predetermined first position from the home position, respective positions of the document detection sensors 60A to 60F also changes. The document size detector 102 identifies the document size with reference to the document size detection table T2 based on the respective detection signals output from the document detection sensors 60A to 60F. Since the respective positions of the document detection sensors 60A to 60F has changed from when the scanner 40 was located in the home position, documents in special sizes that could not be identified when the scanner 40 was located in the home position can be identified.

When the document size detector 102 cannot specify the document size based on the detection signals output from the document detection sensors 60A to 60F when the scanner 40 is preliminarily located in the first position, the document size detector 102 further moves the scanner 40 to a predetermined second position. Then, the document size detector 102 identifies the document size with reference to the document size detection table T3 based on the respective detection signals output from the document detection sensors 60A to 60F when the scanner 40 is located at the predetermined second position.

As described above, the image reading apparatus 10 according to Modification moves the scanner 40 from the home position to the predetermined position when the document size detector 102 cannot identify the size of the document based on the detection signals output from the document detection sensors 60A to 60F when the scanner 40 is located in the home position. Then, the document size detector 102 determines the size of the document placed on the contact glass 32 based on the detection signals output from the document detection sensors 60A to 60F when the scanner is located in the predetermined position in addition to the detection signals output from the document detection sensors 60A to 60F when the scanner 40 is located in the home position. This ensures identifying the size of the document in details.

Supplement

The configurations described in the above-described embodiments and the configurations described in the above-described modifications may be combined. For example, the configuration of the flat cable according to Modification 6 described in FIG. 16C may be employed in another embodiment and modification.

The control program described in the above-described embodiment and the above-described modification may be recorded in a computer readable non-transitory recording medium, such as a hard disk, a CD-ROM, a DVD-ROM, and a semiconductor memory.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus comprising:
a contact glass on which a document as a reading target is placed;
a frame in a box shape that supports the contact glass;
a scanner that includes a reading mechanism extending in a main-scanning direction inside the frame, the scanner reciprocating in a sub-scanning direction in a lower surface side in an opposite side to an upper surface where the document on the contact glass is placed;
a flat cable that contains a plurality of core wires, the flat cable having a flat shaped flat surface, the flat cable having one end connected to a cable port located in the scanner, the flat cable having another end connected to the frame, the flat cable running inside the frame such that a width direction of the flat surface runs along a direction perpendicular to the lower surface of the contact glass; and a control unit that executes a process regarding an image reading operation performed by the image reading apparatus; wherein the flat cable has a side that opposes to the lower surface of the contact glass, the side including a plurality of document detection sensors in a state where detection directions face the lower surface side of the contact glass, the plurality of document detection sensors are electrically connected to any of the core wires among the plurality of core wires contained in the flat cable, the plurality of document detection sensors outputting detection signals transmitted to the control unit via the core wires, and the control unit determines a size of the document placed on the contact glass based on the detection signals output from the plurality of document detection sensors.

2. The image reading apparatus according to claim 1, wherein the control unit determines the size of the document placed on the contact glass based on the detection signals output from the plurality of document detection sensors when the scanner is located in a predetermined home position.

3. The image reading apparatus according to claim 1, wherein the control unit determines the size of the document placed on the contact glass based on the detection signals output from the plurality of document detection sensors when the scanner is located in a predetermined position, in addition to the detection signals output from the plurality of document detection sensors when the scanner is located in the home position, by moving the scanner from the home position to a predetermined position.

4. The image reading apparatus according to claim 1, wherein:

the flat cable includes a plurality of cutout portions that are parts of a film of the notched flat cable; and the plurality of document detection sensors are electrically connected to any of the core wires among the plurality of core wires contained in the flat cable in the cutout portions.

5. The image reading apparatus according to claim 4, wherein:

the plurality of document detection sensors are located in a part of cutout portions among the plurality of cutout portions, the plurality of document detection sensors being electrically connected to the core wires in the part of cutout portions; and the cutout portion without the plurality of document detection sensors among the plurality of cutout portions includes a protective cover that protects the core wires exposed from the cutout portions.

6. The image reading apparatus according to claim 1, wherein:

the flat cable includes a first extending portion that extends from the one end, a second extending portion that extends from the other end, and a curving portion that connects the first extending portion to the second extending portion; and a side that opposes to the lower surface of the first extending portion and the second extending portion in the flat cable includes the plurality of document detection sensors, and a side that opposes to the lower surface of the curving portion lacks the plurality of document detection sensors.

7. The image reading apparatus according to claim 1, wherein:

the flat cable includes a first extending portion that extends from the one end, a second extending portion that extends from the other end, and a curving portion that connects the first extending portion to the second extending portion; and the first extending portion and the second extending portion in the flat cable have undergone a reinforcement process that enhances Young's modulus with respect to the width direction of the flat surface.

8. The image reading apparatus according to claim 1, wherein:

the cable port of the scanner extends in the direction perpendicular to the lower surface of the contact glass; and a side surface perpendicular to the contact glass of the frame includes a frame securing portion that secures the other end of the flat cable such that the width direction of the flat surface runs along the direction perpendicular to the lower surface of the contact glass.

9. An image forming apparatus comprising:

the image reading apparatus according to claim 1; and an image forming unit that forms an image read by the image reading apparatus onto a recording sheet.

* * * * *